(12) United States Patent
Soucaille et al.

(10) Patent No.: US 12,742,663 B2
(45) Date of Patent: Sep. 22, 2026

(54) ABSOLUTE POSITION SENSOR

(71) Applicant: Allegro MicroSystems, LLC, Manchester, NH (US)

(72) Inventors: Rémy Soucaille, Massy (FR); Jean-Michel Daga, Bourg-la-reine (FR)

(73) Assignee: Allegro MicroSystems, LLC, Manchester, NH (US)

( * ) Notice: Subject to any disclaimer, the term of this patent is extended or adjusted under 35 U.S.C. 154(b) by 325 days.

(21) Appl. No.: 18/507,200

(22) Filed: Nov. 13, 2023

(65) Prior Publication Data

US 2025/0155263 A1 May 15, 2025

(51) Int. Cl.
*G01D 5/20* (2006.01)
*G01D 5/14* (2006.01)
*G01D 5/16* (2006.01)

(52) U.S. Cl.
CPC ............... *G01D 5/20* (2013.01); *G01D 5/145* (2013.01); *G01D 5/16* (2013.01)

(58) Field of Classification Search
CPC .. G01R 33/0005; G01R 33/02; G01R 33/028; G01R 33/0283; G01R 33/07;
(Continued)

(56) References Cited

U.S. PATENT DOCUMENTS 3,647,963 A 3/1972 Bailey
4,611,169 A * 9/1986 Hermann .............. G01R 33/02 324/207.17

(Continued)

FOREIGN PATENT DOCUMENTS

EP 0289033 A2 11/1988
EP 4394331 7/2024

(Continued)

OTHER PUBLICATIONS

Response to Search Opinion filed on Jul. 3, 2024 for European Application No. 23177829.1, 27 pages.

(Continued)

*Primary Examiner* — Raul J Rios Russo
*Assistant Examiner* — David B Frederiksen
(74) *Attorney, Agent, or Firm* — Daly, Crowley, Mofford & Durkee, LLP

(57) ABSTRACT

In some embodiments, an absolute position sensing system includes a magnetic field sensor and a target structure. The sensor includes an emitting coil configured to generate a magnetic field in response to a current through the emitting coil, a first arrangement of magnetic field sensing elements, and a second arrangement of magnetic field sensing elements. The target structure includes a plurality of coil elements arranged such that, during movement of the target structure relative to the sensor, the emitted field induces a current in different ones of the coil elements resulting in the generation of non-uniform magnetic fields about the first and second arrangements of magnetic field sensing elements. The sensor is configured to process a first signal from the first arrangement of magnetic field sensing elements and a second signal from the second arrangement of magnetic field sensing elements to determine an absolute position of the target structure.

20 Claims, 23 Drawing Sheets

(58) Field of Classification Search
CPC .......... G01R 33/072; G01R 33/09–098; G01D 5/12; G01D 5/14; G01D 5/145; G01D 5/16; G01D 5/20; G01D 5/204; G01D 5/2073; G01D 5/245; G01D 5/2451; G01D 5/2452; G01D 5/2454; G01D 5/2455; G01D 5/2457
See application file for complete search history.

(56) References Cited

U.S. PATENT DOCUMENTS

| | | | | |
|---|---|---|---|---|
| 4,820,961 | A | 4/1989 | McMullin | |
| 4,853,604 | A | 8/1989 | McMullin et al. | |
| 5,841,274 | A | 11/1998 | Masreliez et al. | |
| 8,453,518 | B2 | 6/2013 | Diekmann et al. | |
| 9,983,045 | B2 | 5/2018 | O'Neill | |
| 10,145,908 | B2 | 12/2018 | David et al. | |
| 10,310,028 | B2 | 6/2019 | Latham et al. | |
| 10,330,499 | B2 | 6/2019 | Elliott et al. | |
| 10,816,366 | B2 | 10/2020 | Weiland et al. | |
| 10,866,122 | B2 | 12/2020 | Weiland et al. | |
| 10,996,289 | B2 | 5/2021 | Latham et al. | |
| 11,079,291 | B2 | 8/2021 | Bertin | |
| 11,112,275 | B2 | 9/2021 | Bertin | |
| 11,333,530 | B2 | 5/2022 | Foletto | |
| 11,346,688 | B2 | 5/2022 | Stewart | |
| 11,408,755 | B2 | 8/2022 | Bertin | |
| 11,662,260 | B2 | 5/2023 | Latham et al. | |
| 2003/0080733 | A1* | 5/2003 | Miyata | G01D 5/208 324/207.17 |
| 2008/0116886 | A1* | 5/2008 | Yamada | G01D 5/145 324/207.21 |
| 2010/0219822 | A1* | 9/2010 | Suzuki | G01D 21/00 324/252 |
| 2013/0090890 | A1* | 4/2013 | Meyer | G01D 5/2452 702/150 |
| 2017/0160102 | A1 | 6/2017 | Heumann et al. | |
| 2017/0166251 | A1 | 6/2017 | Shao et al. | |
| 2018/0274947 | A1 | 9/2018 | Maniouloux et al. | |
| 2019/0242725 | A1 | 8/2019 | Shaga et al. | |
| 2019/0316936 | A1* | 10/2019 | Mori | G01D 5/2086 |
| 2019/0331541 | A1 | 10/2019 | Janisch et al. | |
| 2020/0240812 | A1* | 7/2020 | Kubozono | G01D 5/2451 |
| 2020/0300670 | A1* | 9/2020 | Cook | G01D 5/2053 |
| 2021/0190545 | A1 | 6/2021 | Utermoehlen et al. | |
| 2022/0239462 | A1 | 7/2022 | Casu et al. | |
| 2023/0160722 | A1* | 5/2023 | Brajon | G01D 5/2452 324/202 |
| 2023/0258515 | A1 | 8/2023 | Ostermann et al. | |
| 2023/0417579 | A1 | 12/2023 | Latham et al. | |

FOREIGN PATENT DOCUMENTS

| | | |
|---|---|---|
| WO | WO 2006/079793 | 8/2006 |
| WO | WO 2022/132229 | 6/2022 |

OTHER PUBLICATIONS

Office Action dated Jan. 17, 2025 for U.S. Appl. No. 17/809,382, 32 pages.
Response to Office Action dated Jan. 17, 2025, filed on Feb. 10, 2025 for U.S. Appl. No. 17/809,382, 17 pages.
Notice of Allowance dated May 21, 2025 for U.S. Appl. No. 17/809,382, 12 pages.
U.S. Appl. No. 17/659,224, filed Apr. 14, 2022, Casu, et al.
U.S. Appl. No. 17/809,382, filed Jun. 28, 2022, Latham, et al.
U.S. Appl. No. 18/475,674, filed Sep. 27, 2023, Casu, et al.
U.S. Appl. No. 18/362,357, filed Jul. 31, 2023, Ali, et al.
Posic Datasheet "IT3402L Triple Channel Linear Encoder Kit", 2021, 4 pages.
Extended European Search Report dated Oct. 23, 2023, for European Application No. 23177829.1-1001; 13 pages.
Extended European Search Report dated Mar. 17, 2025 for European Application No. 24185072.6; 15 pages.
Intention to Grant dated Mar. 27, 2025 for European Application No. 23177829.1; 7 pages.

* cited by examiner

ABSOLUTE POSITION SENSOR

BACKGROUND

Magnetic field sensors can be used to detect motion or position of various types of targets that generate or perturb magnetic fields. Magnetic field sensors find application in various areas of technology including robotics, automotive, manufacturing, etc. For example, a magnetic field sensor may be used to detect when a vehicle's wheel locks up, triggering the vehicle's control processor to engage the anti-lock braking system. In this example, the magnetic field sensor may detect rotation of the wheel. Magnetic field sensors may also detect linear position or distance to objects. For example, a magnetic field sensor may be used to detect the absolute position of a hydraulic piston.

SUMMARY

Described herein are systems and methods for detecting absolute position of a target based on the vernier scale principle.

According to one aspect of the present disclosure, a system includes a magnetic field sensor and a target. The sensor includes an emitting coil configured to generate a magnetic field in response to a current through the emitting coil, a first arrangement of magnetic field sensing elements, and a second arrangement of magnetic field sensing elements. The target is configured to move relative to the magnetic field sensor and includes a plurality of target coil elements arranged such that, during the movement, the magnetic field induces a current in different ones of the target coil elements resulting in the generation of non-uniform magnetic fields about the first and second arrangements of magnetic field sensing elements.

In some embodiments, each of the target coil elements can include: a receiver coil; a first transmitter coil connected to the receiver coil; and a second transmitter coil connected to the receiver coil. In some embodiments, the first and second transmitter coils may both be in a linear arrangement. In some embodiments, the first transmitter coils can be spaced apart by a first pitch and the second transmitter coils can be spaced apart by a second pitch different from the first pitch. In some embodiments, there may be n+1 target coil elements in the plurality, the second pitch may be P, and the first pitch may be $$\frac{n+1}{n}P.$$

In some embodiments, the target coil elements can be arranged such that, during the movement, different ones of the target coil elements pass over the magnetic field sensor, with the receiver coils passing over the emitting coil, the first transmitter coils passing over the first arrangement of magnetic field sensing elements, and the second transmitter coils passing over the second arrangement of magnetic field sensing elements.

In some embodiments, the target coil elements can have a bilayer arrangement. In some embodiments, the target coil elements have a single-layer arrangement.

In some embodiments, the first arrangement of magnetic field sensing elements can include a first plurality of magnetoresistive (MR) elements and the second arrangement of magnetic field sensing elements can include a second plurality of MR elements. In some embodiments, the first plurality of MR elements and the second plurality of MR elements may both include four MR elements, with the eight MR elements connected to form four Wheatstone bridges. In some embodiments, the first plurality of MR elements and the second plurality of MR elements may both include three MR elements, with the six MR elements connected to form four Wheatstone bridges.

In some embodiments, the first arrangement of magnetic field sensing elements may include a first plurality of Hall elements and the second arrangement of magnetic field sensing elements may include a second plurality of Hall elements.

In some embodiments, the first arrangement of magnetic field sensing elements can include a first arrangement of superimposed coils and the second arrangement of magnetic field sensing elements can include a second arrangement of superimposed coils. In some embodiments, the target coil elements may be arranged in a circular arrangement.

In some embodiments, the first arrangement of magnetic field sensing elements can be configured to generate a first pair of orthogonal signals responsive to the movement and the second arrangement of magnetic field sensing elements can be configured to generate a second pair of orthogonal signals responsive to the movement. In some embodiments, the system can further include circuitry configured to: receive the first pair of orthogonal signals from the first arrangement of magnetic field sensing elements; receive the second pair of orthogonal signals from the second arrangement of magnetic field sensing elements; and determining an absolute position of the target relative to the magnetic field sensor using the first and second pairs of orthogonal signals.

According to one aspect of the present disclosure, a target structure for use in a magnetic field sensing system includes: a plurality of coil elements each having a receiver coil, a first transmitter coil connected to the receiver coil, and a second transmitter coil connected to the receiver coil, wherein the first transmitter coils are spaced apart by a first pitch and the second transmitter coils are spaced apart by a second pitch different from the first pitch.

Disclosed position sensors use separate components for the magnetization of a target and generation of the non-uniform magnetic. This arrangement is less sensitive to crosstalk between the field created by the excitation coil and the magnetic field created by the target and, thus, it improves the linearity of the sensor. Disclosed embodiments use a single emitting coil to generate a field in both master and Nonius tracks of a target.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

Figure 1:
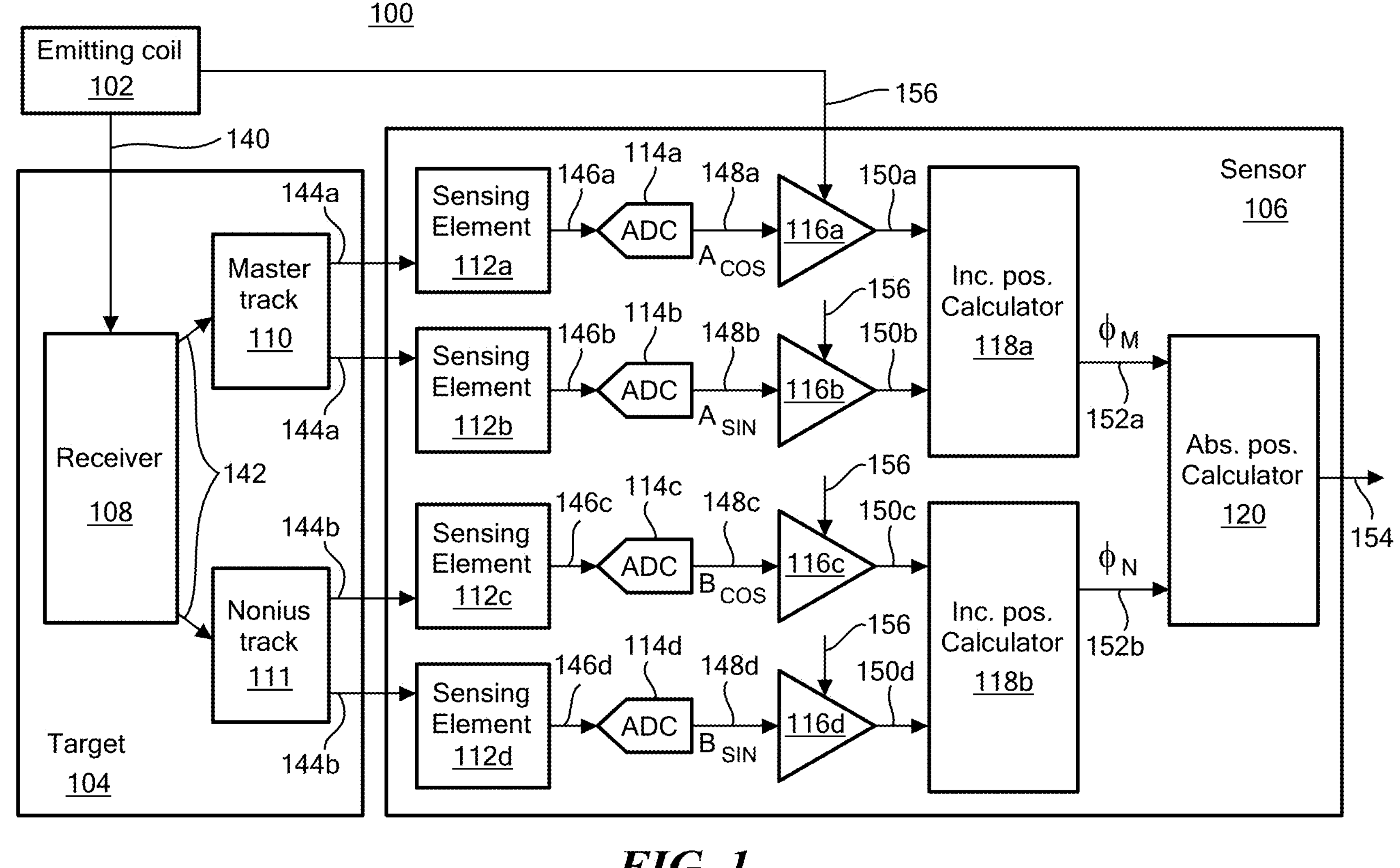
FIG. 1 is a block diagram of an absolute position sensing system having a sensor and a target configured to move linearly relative to the sensor, according to some embodiments.

The drawings are not necessarily to scale, or inclusive of all elements of a system, emphasis instead generally being placed upon illustrating the concepts, structures, and techniques sought to be protected herein.

DETAILED DESCRIPTION

As used herein, the term "magnetic field sensing element" is used to describe a variety of electronic elements that can sense a magnetic field. A magnetic field sensing element can be, but is not limited to, a Hall Effect element, a magnetoresistance element, a magnetotransistor, or simply a coil that exhibits induced current in the presence of a varying magnetic field (referred to herein as "coiled sensing element").

As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses one or more magnetic field sensing elements, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the terms "target" and "magnetic target" are used to describe an object to be sensed or detected by a magnetic field sensor or magnetic field sensing element.

FIG. 1 shows an example of an absolute position sensing system 100, according to some embodiments. Illustrative system 100 includes an emitting coil 102, a target 104, and a magnetic field sensor 106. Coil 102 and sensor 106 may be collocated (e.g., both provided on the same printed circuit board, PCB) whereas target 104 may be moveable with respect to coil 102 and sensor 106. Thus, coil 102 may be considered part of sensor 106 in some cases. In some cases, target 104 may move linearly with respect to coil 102 and sensor 106. In other embodiments, target 104 may rotate with respect to coil 102 and sensor 106.

Emitting coil 102 can be formed from a single conductive path arranged as a coil, or multiple such conductive paths. Emitting coil 102 be supplied with alternating current (AC) from an oscillator (or "coil driver," not shown) to produce an AC magnetic field 140 (i.e., a magnetic field with alternating orientation) about the target 104 (i.e., magnetizing the target). The emitting coil 102 may be driven at a particular frequency, $f_{em}$, to produce AC magnetic field 140 at that frequency. The coil driver (not shown) may be collocated with the emitting coil 102 and/or sensor 106 (e.g., on the same PCB).

Target 104 includes a plurality of elements formed of conductive material (e.g., metal traces formed on a substrate) and arranged such that current is induced in different ones of the elements as the target 104 moves relative to emitting coil 102 and sensor 106. Specific layouts and arrangements of target elements that may be used within system 100 are described in detail below. In general, the target elements can be arranged to form a receiver 108 (or "secondary coil"), a master track 110, and a Nonius track 111. The receiver 108 can be positioned substantially over the emitting coil 102 and configured such that magnetic field 140 induces current 142 in the target 104. The two tracks (or "emitters") 110 and 111 may be coupled to receive the induced current 142 and configured to generate non-uniform magnetic fields 144*a* and 144*b*, respectively, in response to induced current 142 flowing through different ones of the target elements. As will be illustrated in subsequent figures, the tracks 110, 111 are localized on the target 104 and move relative to both sensor 106 and emitting coil 102.

The non-uniformity of magnetic fields 144*a*, 144*b* may result from the spacing (pitch) of target elements along the master track 110 being different from that of those along the Nonius track 111. For example, assuming target 104 has n+1 elements where n is an even number, the master track 110 may have pitch $$\frac{n+1}{n}P$$

and the Nonius track 111 may have pitch P. Thus, tracks 110 and 111 form a vernier scale.

Sensor 106 includes a magnetic field sensing elements 112*a-d* (112 generally), analog-to-digital converters (ADCs) 114*a-d* (114 generally), adjustment blocks 116*a-d* (116 generally), incremental position calculators 118*a*, 118*b* (118 generally), and an absolute position calculator 120. The numbers and arrangement of the sensor components shown in FIG. 1 is merely one example and other numbers/arrangements may be provided. Scaling/offset blocks 116, incremental position calculators 118, and absolute position calculator 120 may be implemented as digital signal processing (DSP).

Magnetic field sensing elements 112 may be arranged to allow detection of incremental positions (e.g., phases) of the target's master and Nonius tracks 110, 111 by measuring the non-uniform magnetic fields 144*a*. 144*b* emitted by those tracks. In the example of FIG. 1, sensing elements 112*a* and 112*b* are arranged to sense field 144*a* and output signals 146*a* and 146*b*, respectively, whereas sensing elements 112*c* and 112*d* are arranged to sense field 144*b* and output analog signals 146*c* and 146*d*. Signals 146*a-d* may be analog signals responsive to a position of the target 104 and referred to as analog magnetic field signals 146. In some cases, pairs of sensing elements 112 may be arranged to output pairs of analog magnetic field signals 146 that are orthogonal to each other (e.g., one signal may be referred to as a sine signal and the other as a cosine signal). Other numbers and arrangements of sensing elements may be used in other embodiments. Sensing elements 112 can include, for example, magnetoresistive (MR) elements, Hall elements, or coiled elements. In general, any elements or devices capable of measuring a magnetic field, either in-plane or out-of-plane field, may be used. In some embodiments, magnetic field sensing elements 112 may include two or more magnetic field sensing elements arranged in a half bridge or full bridge, as discussed further below.

The magnetic field signals 146 may be at the frequency of the AC magnetic field 140 (i.e., at $f_{em}$). Thus, in some embodiments, sensor 106 may include low-pass filters or other circuitry to demodulate the signals 146 to a lower frequency (e.g., baseband).

ADCs 114 are configured to convert analog magnetic field signals 146*a-d* to respective digital representations 148*a-d*, referred to herein as digital magnetic field signals 148. In the embodiment of FIG. 1, four ADCs 114*a-d* are provided, one for each of the four sensing channels.

Adjustment blocks 116 are configured to correct for offset and sensitivity mismatches in digital magnetic field signals 148. For example, adjustment blocks 116 can apply scaling and/or offset correction to digital magnetic field signals 148*a-d* to produce adjusted signals 150*a-d*, respectively. To correct for offset, adjustment blocks 116 may apply one or more offset correction values (e.g., one offset correction value per bridge) to match the sensitivity of two or more of the signals 150*a-d* (e.g., to match the sensitivity of two signal generated by a pair of bridges). In some cases, the offset correction values may be predetermined, meaning that they can be set/fixed in the factory at the time of manufacture, or by external means (e.g., programming) thereafter. In some cases, sensor 106 may include a memory device configured to store the offset correction values. In general, adjustment blocks 116 can adjust the offset of digital magnetic field signals 148*a-d* using digital signal processing such that the adjusted signals 150*a-d* have waveforms centered around zero and with substantially equal amplitude.

One or more of the adjustments block 116 can correct for (i.e., cancel out) the effect of coupling between the emitting coil 102 and the sensor 106. For TMR sensing, the coupling effect depends on the position of the MR elements relative to the emitting coil. For coil sensing, this is an effect of direct coupling between the emitting coil and the sensing coils as the magnetic flux created by the emitting coil is not zero when integrated over the surface of the sensing elements, which is different for a "gradient" coil (e.g., sensing element 112*a*) and a "$2^{nd}$ order" coil (e.g., sensing element 112*b*). In some cases, the coupling can be measured and trimmed by applying a signal to the coil and measuring the output of the signal without target, it should be zero, if not zero one should make a correction using digital signal processing. In some cases, during normal operation, a low frequency signal may be generated on the emitting coil 102 (much lower than the modulation frequency, and low enough not to induce significant current in the elements of the target); this signal can serve as an offset on the field measurement which can be corrected via digital signal processing. As shown in FIG. 1, in some cases, each of the adjustment blocks 116 can receive a signal 156 from the emitting coil or coil driver indicating the current through the emitting coil 102, and correct for coupling based on this signal 156.

Incremental position calculators 118*a* and 118*b* are each configured to calculate an incremental position of the target 104. In more detail, first incremental position calculator 118*a* is configured to receive adjusted signals 150*a*, 150*b* and calculate a first phase angle 152*a* ($\phi_M$) associated with the target master track 110, and second incremental position calculator 118*b* is configured to receive adjusted signals 150*c*, 150*d* and calculate a second phase angle 152*b* ($\phi_N$) associated with the target Nonius track 111.

In some embodiments, first incremental position calculator 118*a* may be configured to calculate first phase angle 152*a* as:

$$\phi_M = a\tan 2(A_{cos} + iA_{sin}). \quad (1)$$

Likewise, second incremental position calculator 118*a* may be configured to calculate second phase angle 152*b* as:

$$\phi_N = a\tan 2(B_{cos} + iB_{sin}). \quad (2)$$

In the above, $\phi_M$ and $\phi_M$ may be expressed as multiples of 2π.

The incremental position of the master track 110 is thus:

$$\frac{(n+1)}{2\pi n}P\phi_M \mathrm{mod}\left[\frac{n+1}{n}P\right]$$

and the incremental position of the Nonius track 111 is:

$$\frac{P}{2\pi}\phi_N \mathrm{mod}[P]$$

where:

n+1 is the number of target elements, n is even;

$$\frac{n+1}{n}P$$

is the pitch of the master track 110;

P is the pitch of the Nonius track 111;

$\phi_M$ is the incremental phase of the master track 110; and $\phi_N$ is the incremental phase of the master track 111.

Absolute position calculator 120 is configured to receive calculated phase angles 152*a*, 152*b* and use them to calculate an absolute position 154 of the target 104 (e.g., an absolute linear position or angle of target 104 relative to sensor 106 and emitting coil 102). Because the two target tracks 110, 111 have different pitches, the two phase angles, $\phi_M$ and $\phi_N$ collectively indicate which "graduation" the target is positioned at and, thus, calculator 120 can apply the vernier principle to determine the absolute position 154. In more detail, calculator 120 can calculate a difference, modulus 2π, between $\phi_M$ and $\phi_N$ and map that difference to a target displacement value, such as illustrated in FIG. 9B. The difference is herein denoted Δϕ.

To improve accuracy, an optimization technique may be used in some embodiments. For example, absolute position calculator 120 may calculate absolute position by $$P(\phi_N + k_N) \text{ and } \frac{n+1}{n}P(\phi_M + k_M)$$

where $$(k_M, k_N) \in \left[\!\left[-\frac{n}{2}, \frac{n}{2}\right]\!\right]^2 \text{ and } |k_M| < |k_N|$$

the combination ($k_M$, $k_N$) is selected to minimize the following expression:

$$\left|\left((\phi_M + 2\pi k_M)\frac{n+1}{n} - n\Delta\phi\right)^2 + (\phi_N + 2\pi k_N - n\Delta\phi)^2\right| \quad (3)$$

where $k_M$ is the nearest (calculated) element of the target relative to the master track (110) origin and $k_N$ is the nearest (calculated) element of the target relative to the Nonius track (111) origin. In some cases, the "nearest" element is calculated to be the sensing element which is closest to the center point of the respective sensing element(s). More particularly, the element for which its coin/loop portion (e.g., 422 or 426 in FIG. 4A) is closest to said sensing element(s).

In some cases, the absolute position (i.e., output) can be calculated as $P(\phi_N/2\pi + k_N)$.

Figure 2:
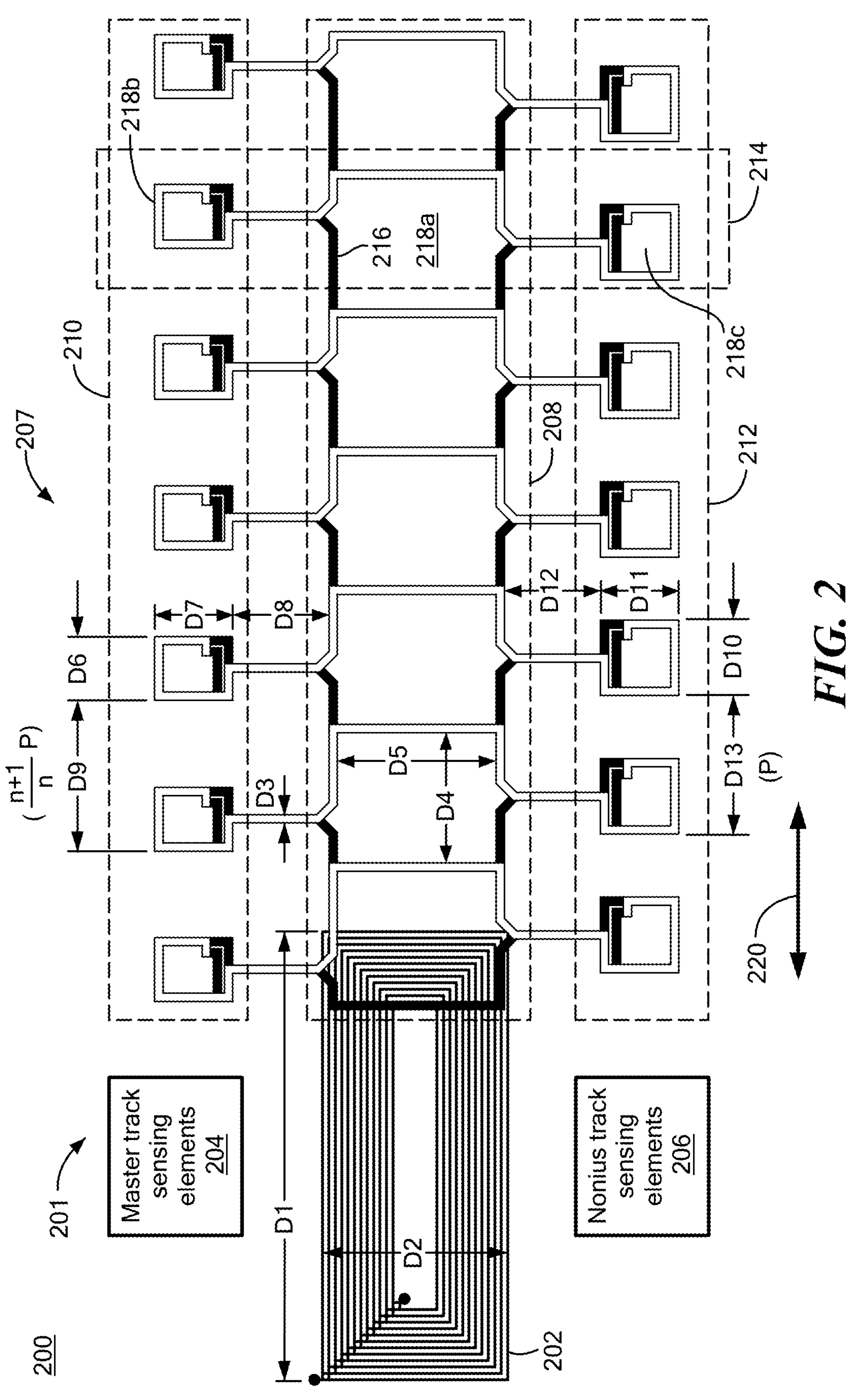
FIG. 2 is a top view of an absolute position sensing system, according to some embodiments.

FIG. 2 shows an example of an absolute position sensing system 200 configured to detect linear position of a target. Illustrative system 200 includes a sensor 201 comprising an emitting coil 202, one or more magnetic field sensing elements 204 configured to detect position of the target's master track, one or more magnetic field sensing elements 206 configured to detect position of the target's Nonius track, and circuitry (not shown) configured to process magnetic field signals generated by sensing elements 204, 206 and to calculate the target's absolute position. The magnetic field sensing elements 204, 206 and processing circuitry provided within system 200 may be the same as, or similar to, the sensing elements and circuitry shown and described in the context of sensor 106 of FIG. 1.

As shown, emitting coil 202 can have a rectangular shape with side lengths D1 and D2. In one example, D1 is about 12 mm and D2 is about 5 mm and D2. In some embodiments, coil 202 can include twenty-four (24) turns over two layers (2). Other coil geometries and dimensions may be used. In some embodiments, the sensor (i.e., coil 202 and sensing elements 204, 206) can have a total area/footprint of $13\times16$ mm$^2$. In some embodiments, there may be a 1 mm air gap between the target and sensor (e.g., one or more structures of target 207 may be positioned about 1 mm above one or more structures of sensor 201).

Illustrative system 200 further includes a target 207 comprising a plurality (n+1) of elements forming a receiver 208, a master track 210, and a Nonius track 212, as shown. In the example of FIG. 2, the target has n+1=7 elements of which element 214 is representative. The target elements may be disposed on a common structure such that the tracks 210, 212 are localized on the target. As an example, target elements may be formed as metal (e.g., copper) traces drawn onto one or more layers of PCB. In the case of a bilayer target, two layers of PCB may be used, both having relatively minimal thickness. Target 207 may be positioned above or below sensor 201 and configured to move linearly along an axis 220, relative to sensor 201.

Each target element may be formed of conductive material arranged to electrically couple the receiver portion of the element to both the master and Nonius track portions of the element. For example, using target element 214 as an example, conductive material 216 may be arranged to form a receiver coil (or "loop") 218*a*, a master track coil 218*b*, and a Nonius track coil 218*c*. The target elements may have a single layer or bilayer construction, as described in detail below. The three coils 218*a-c* may be arranged such that, when receiver coil 218*a* passes over and is magnetized by emitting coil 202, master track coil 218*b* produces a magnetic field detectable by master track sensing elements 204 and Nonius track coil 218*c* produces a magnetic field detectable Nonius track sensing elements 206.

As shown, a target element may have one or more of the following characteristics: conductive material 216 may have width D3; receiver coil 202 may have a rectangular shape with side lengths D4 and D5; a coil of master track 210 may have a rectangular shape with side lengths D6 and D7 and be spaced from its associated receiver coil by a distance D8; master track 210 may have a pitch of $$D9\left(\frac{n+1}{n}P\right);$$

a coil of Nonius track 212 may have a rectangular shape with side lengths D10 and D11 and be spaced from its associated receiver coil by a distance D12; and Nonius track 212 may have a pitch of D13 (P). In one example, D3 is about 0.25 mm, D4 is about 4 mm, D5 is about 5 mm, D6 is about 2.5 mm, D7 is about 2 mm, D8 is about 3 mm, D9 is about 4.4 mm, D10 is about 2 mm, D11 is about 2 mm, D12 is about 3 mm, and D13 is about 4 mm. By definition, $$D9\left(\frac{n+1}{n}P\right)$$

is a function of D13 (P) and the number of target elements (n+1), where n+1=11 in the example of FIG. 2, here only 7 of the elements are shown.

As shown in the example of FIG. 2, the target elements forming master track 210 may be arranged linearly, the target elements forming Nonius track 212 may also be arranged linearly, and these two linear arrangements may be substantially parallel to each other. Other arrangements of target elements may be used.

As previously discussed, the non-uniform pitches D9. D13 between the two tracks results in non-uniform magnetic fields detected by the two sets of sensing elements 204, 206. This non-uniformity can be used to determine the absolute position of target 207 with respect to sensor 201.

Figure 3:
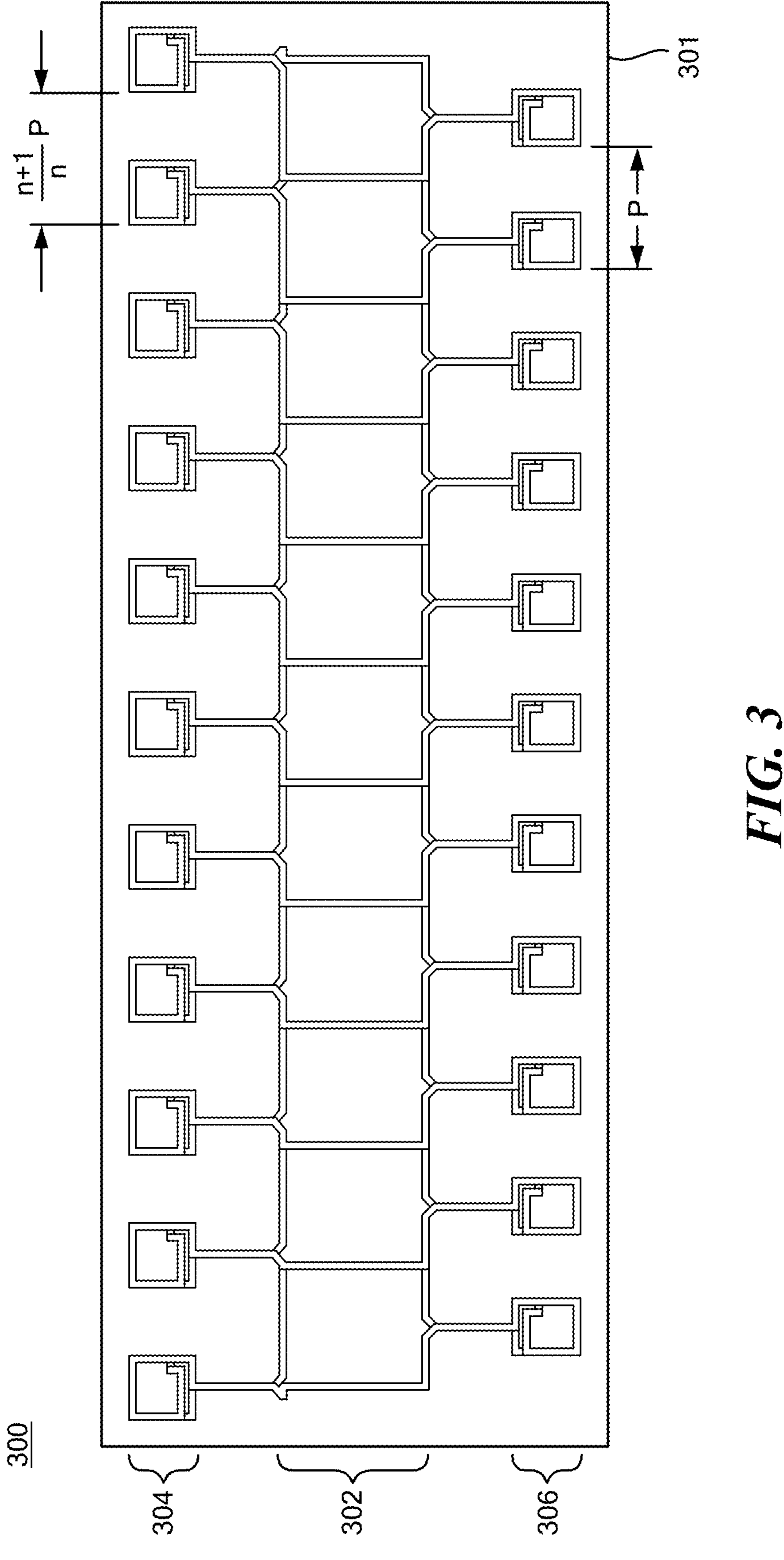
FIG. 3 is a top view of a linear motion target having a plurality of bilayer elements arranged to form two tracks, according to some embodiments.
Figure 3A:
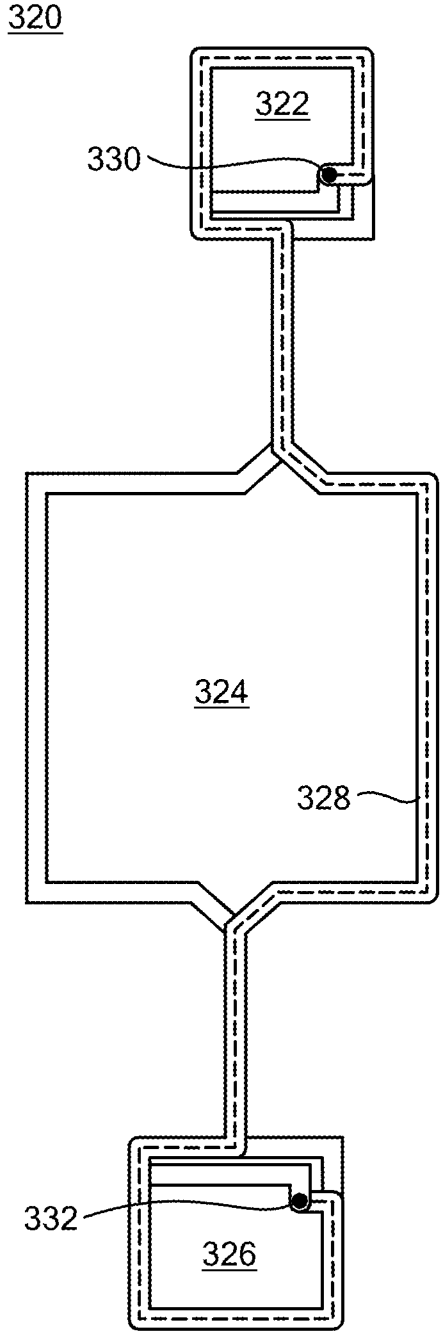
FIG. 3A is a top view of a bilayer element that may be provided within the target of FIG. 3.

FIGS. 3 and 3A show an example of a target 300 having a bilayer construction, according to some embodiments. In more detail, target 300 can be comprised of a plurality of target elements formed on two different layers of a structure 301 (e.g., a substrate) and arranged to form a receiver 302, a master track 304, and a Nonius track 306. FIG. 3A shows an example of a bilayer target element 320 for which conductive material 328 is disposed on two different layers of the structure 301 to form a receiver coil 324, a master track coil 322, and a Nonius track coil 326. In the figure, dashed lines correspond to portions of conductive material 328 that are disposed on a first layer (e.g., a top layer) of structure 301 and solid lines correspond to portions of conductive material 328 that are disposed on a second layer (e.g., a bottom layer) of structure 301. The conductive material on the first and second layers may be connected by one or more vias (e.g., vias 330 and 332 in the figure). Of note, while adjacent target elements appear to touch in FIG. 3, this is simply to illustrate the bilayer construction. There is no electrical contact between different elements. In some embodiments, the second layer may be arranged to face a magnetic field sensor, such as sensor 201 of FIG. 2. Illustrative target element 320 includes a receiver coil 324, a master track coil 322, and a Nonius track coil 326.

Figure 4:
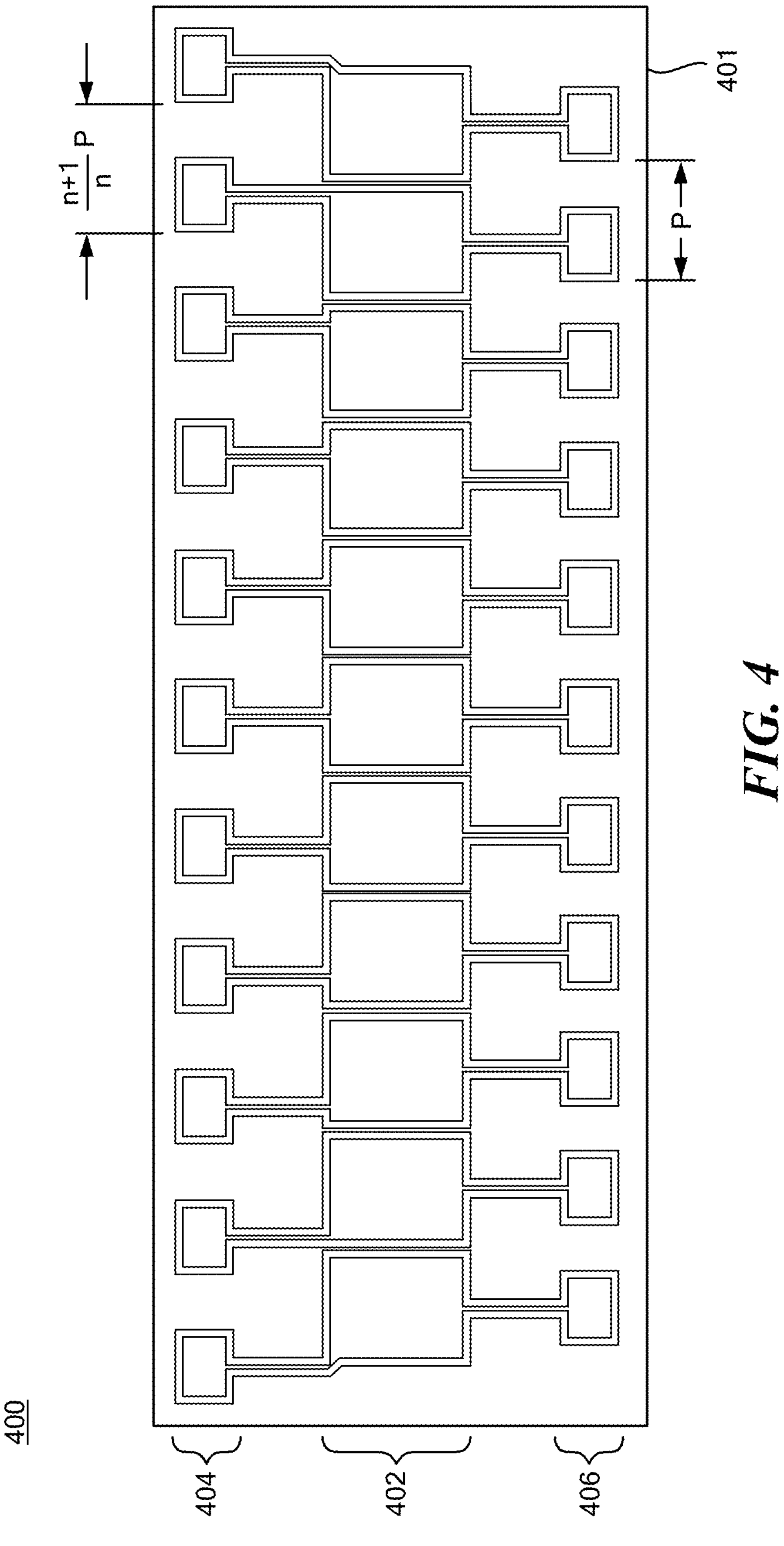
FIG. 4 is a top view of a linear motion target having a plurality of single layer elements arranged to form two tracks, according to some embodiments.
Figure 4A:
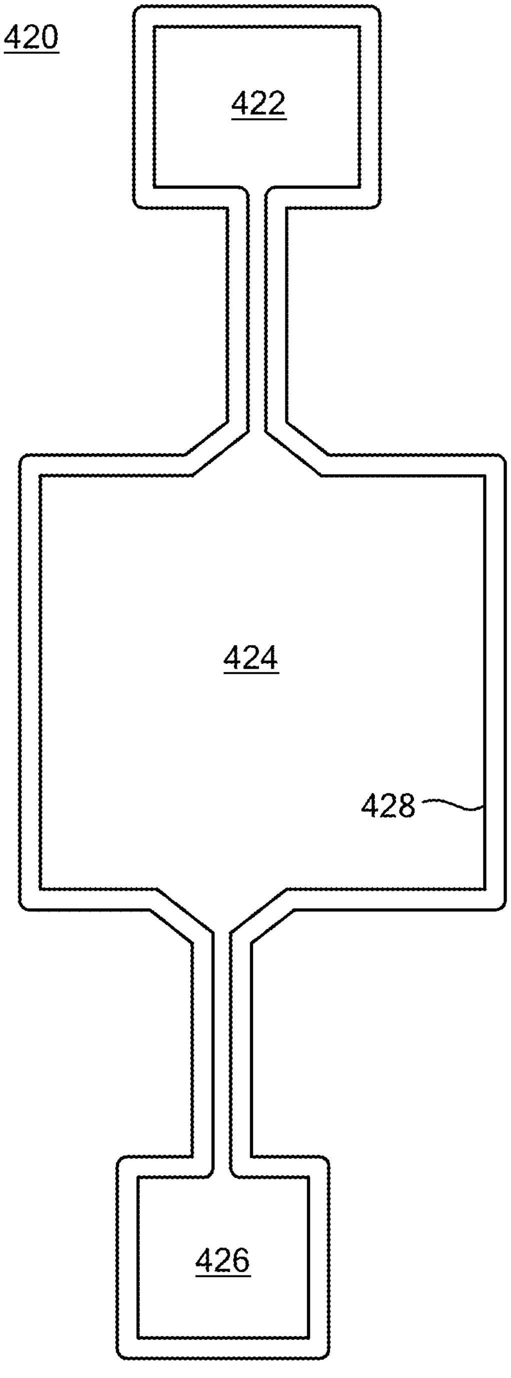
FIG. 4A is a top view of a single-layer element that may be provided within the target of FIG. 4.

FIGS. 4 and 4A show an example of a target 400 having a single layer construction, according to some embodiments. In more detail, target 400 can be comprised of a plurality of target elements formed on a single layer of a structure 401 (e.g., a substrate) and arranged to form a receiver 402, a master track 404, and a Nonius track 406. FIG. 4A shows an example of a target element 420 for which conductive material 428 is disposed on a single layer of the structure 401 to form a receiver coil 424, a master track coil 422, and a Nonius track coil 426. The single layer may be arranged to face a magnetic field sensor, such as sensor 201 of FIG. 2.

Figure 5:
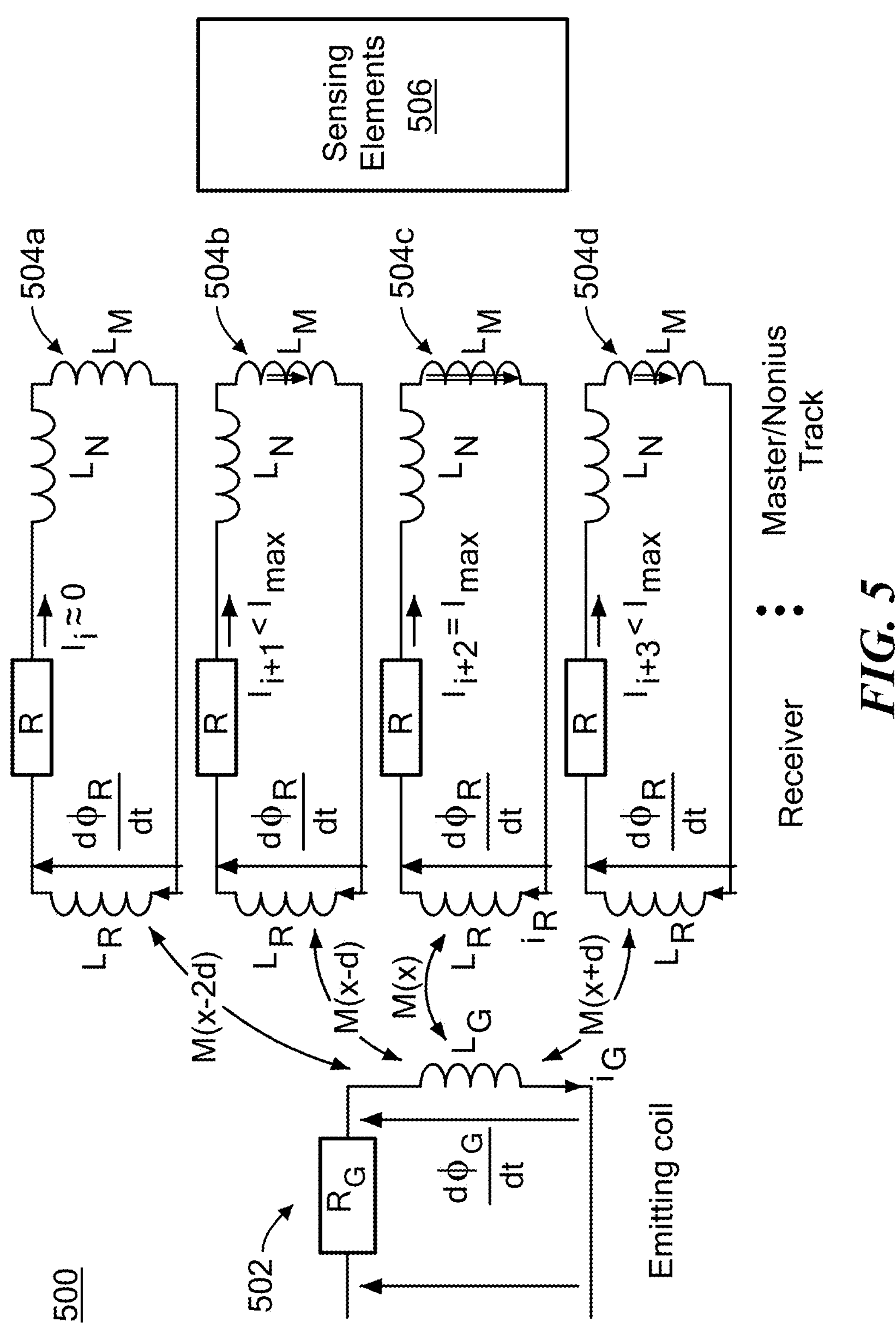
FIGS. 5 and 5A are diagrams illustrating inductive coupling between an emitting coil and target elements of an absolute position sensing system, according to some embodiments.
Figure 5A:
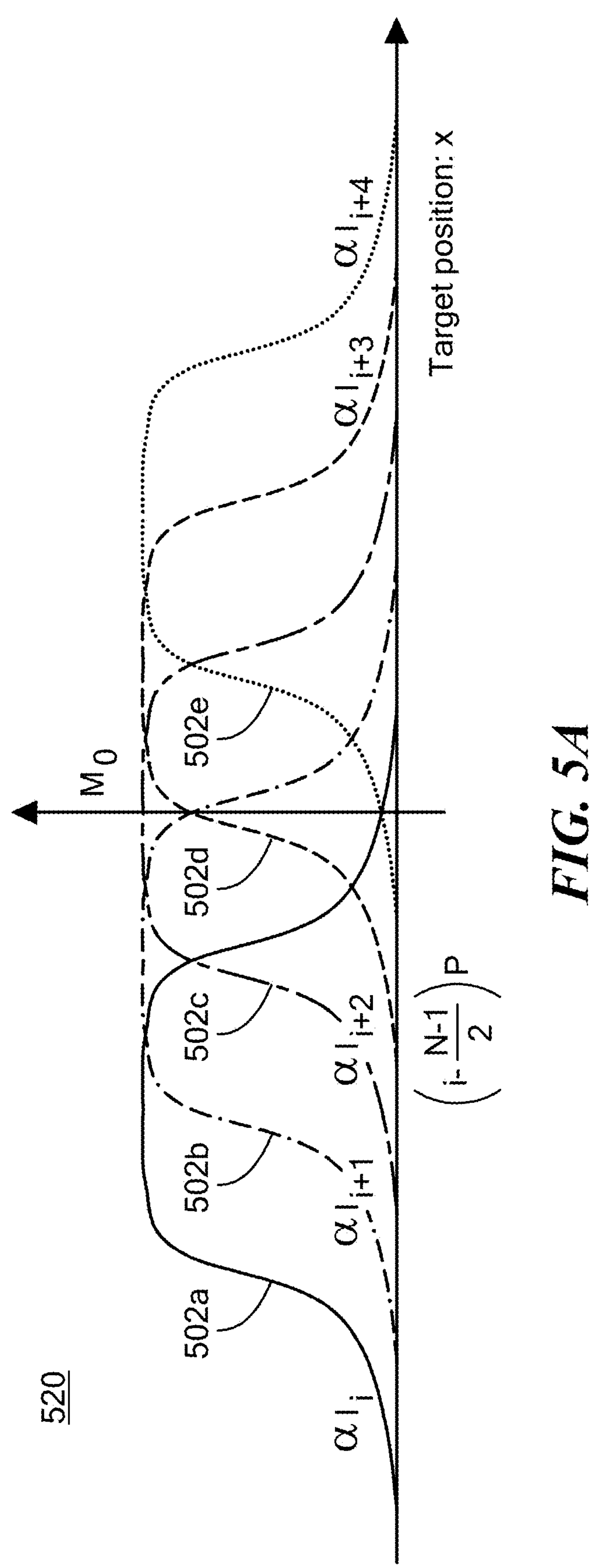

FIGS. 5 and 5A illustrate inductive coupling between an emitting coil and target elements of an absolute position sensing system, according to some embodiments.

Referring to FIG. 5, an absolute position sensing system 500 includes an emitting coil 502, a plurality of target elements 504*a*, 504*b*, 504*c*, 504*d*, etc. (504 generally), and one or more magnetic field sensing elements 506. While four (4) target elements 504*a-d* are shown in this example, other numbers of target elements can be provided.

Emitting coil 502 can be modeled as a circuit having a current source ($i_G$), a resistor ($R_G$), and an inductor ($L_G$) connected in series as shown.

Each of the target elements 504 can be modeled as a first inductor ($L_R$), a resistor (R), and a second inductor ($L_E$) connected in series as shown. The first inductor ($L_R$) corresponds to the receiver coil that can be inductively coupled to emitting coil 502. That is, each receiver coil ($L_R$) forms the secondary of an electrical transformer with the emitting coil ($L_G$). The second inductor ($L_E$) corresponds to a master or Nonius track coil that can be detected using sensing elements 506. That is, the master/Nonius track coils may "reflect" magnetic field onto the sensing elements 506. The strength of coupling between emitting coil 502 and a particular target element 504 can be expressed in terms of a mutual inductance, M, that depends on the distance therebetween.

Emitting coil induces current $I_1$, $I_2$, $I_3$, and $I_4$ (and so on) in target elements 504*a*, 504*b*, 504*c*, and 504*d*, respectively, where the magnitude of an induced current depends on the mutual inductance. For example, in the configuration of FIG. 5, element 504*a* may have a minimum induced current ($I_1 \approx 0$) because it is farthest away from emitting coil 502 whereas element 504*c* may have maximum induced current $I_3 = I_{max}$ because it is closest to emitting coil 502 (e.g., superposed on emitting coil). Current induced in the other target elements 504*b*, 504*d* may be between the minimum and maximum ($0 < I_2, I_4 < I_{max}$).

In some embodiments, system 500 may be configured to provides constant coupling between the emitting coil 502 and individual receiver coils. In some embodiments, system 500 may be configured such that at least two target elements 504 may have significant coupling with the emitting coil 502 as the target moves freely with respect to the sensor.

In some embodiments, sensing elements 506 can include TMR elements arranged to measure an X-component of a magnetic field reflected by the master/Nonius track coils ($L_E$). In other embodiments, sensing elements 506 can include coiled magnetic field sensing elements (i.e., induction sensing elements) arranged to measure a Z-component of the reflected magnetic field. Various types and arrangements of sensing elements that may be used are described in detail below.

Turning to FIG. 5A, a graph 520 illustrates evolution of mutual inductance (vertical axis) of different target elements when the target is swept in front of the emitting coil (i.e., changes position, horizontal axis). Mutual inductance is minimum (e.g., zero 0) when the target elements are away from the emitting coil, reach a plateau when above the emitting coil and decrease after. Plots 502*a*-502*e* correspond to different target elements, each offset by the pitch of the target. The notation $\propto I_i$, $\propto I_{i+1}$, etc. in the figure illustrates that the field output is proportional to the current passing inside the elements i, i+1, etc. $M_0$ indicates a maximum of the mutual inductance.

Figure 6A:
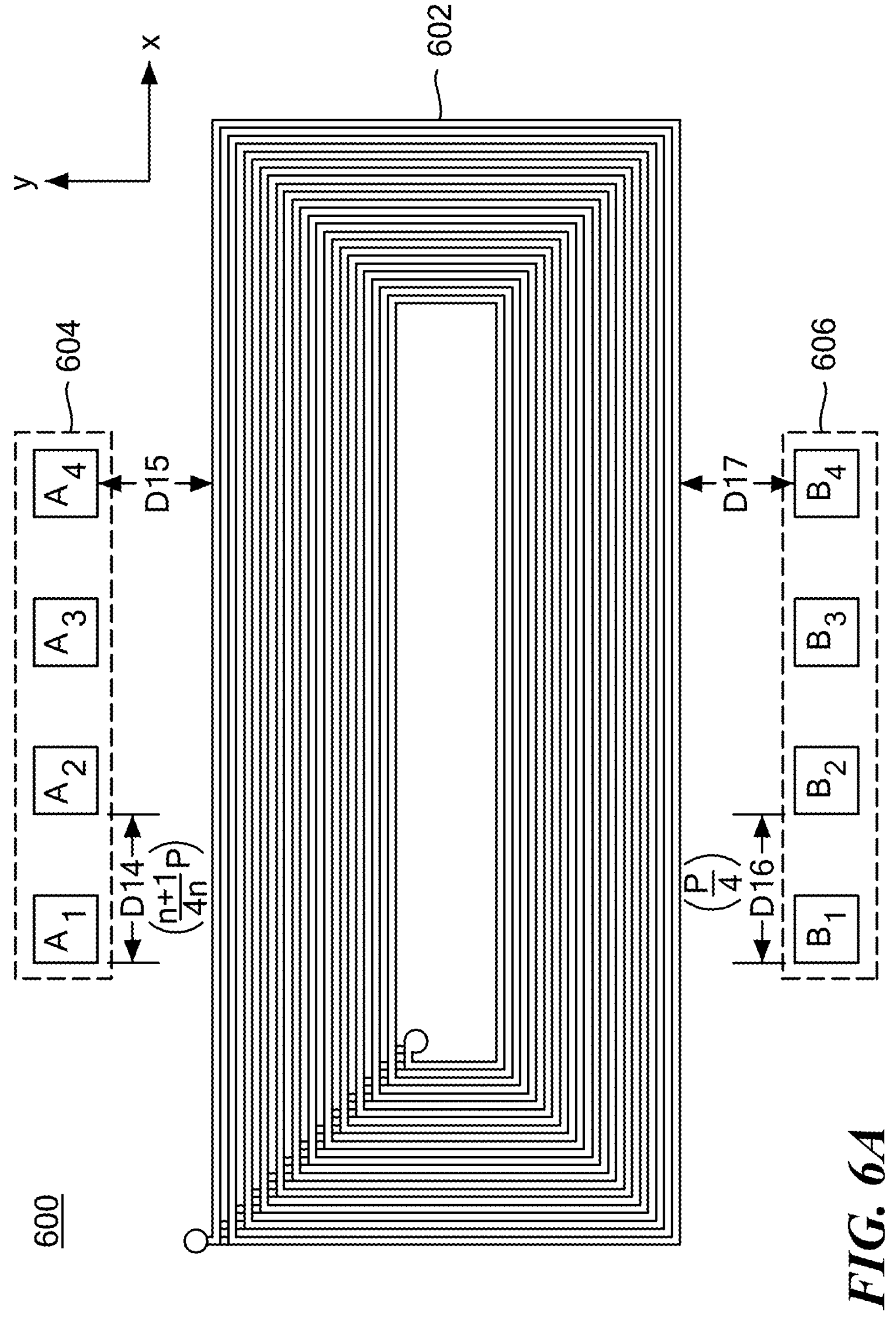
FIG. 6A is a top view of an absolute position sensor having two groups of magnetic field sensing elements arranged on opposite sides of an emitting coil, according to some embodiments.
Figure 6B:
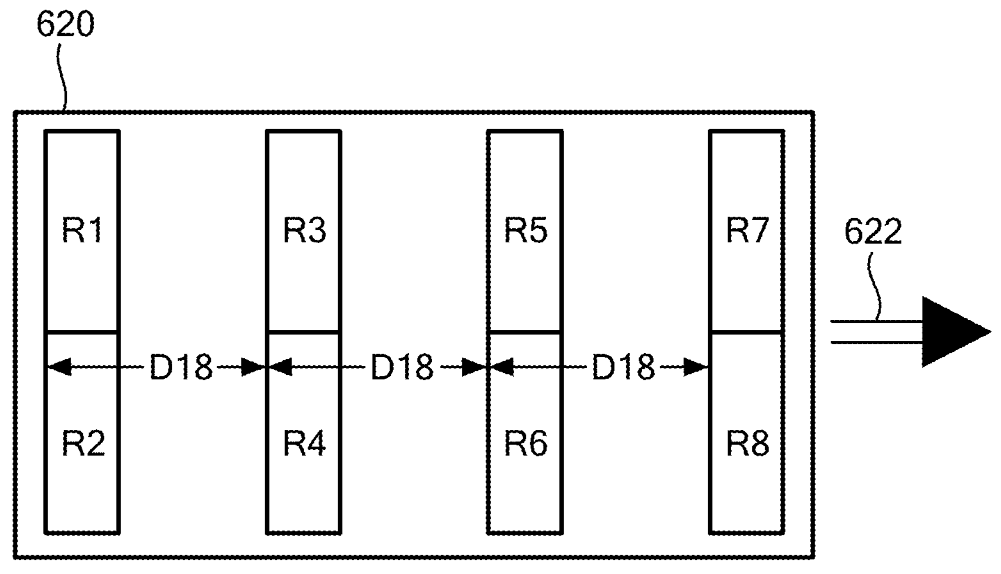
FIG. 6B is a schematic diagram showing a configuration of magnetic field sensing elements that may be used with the sensor of FIG. 6A.
Figure 6C:
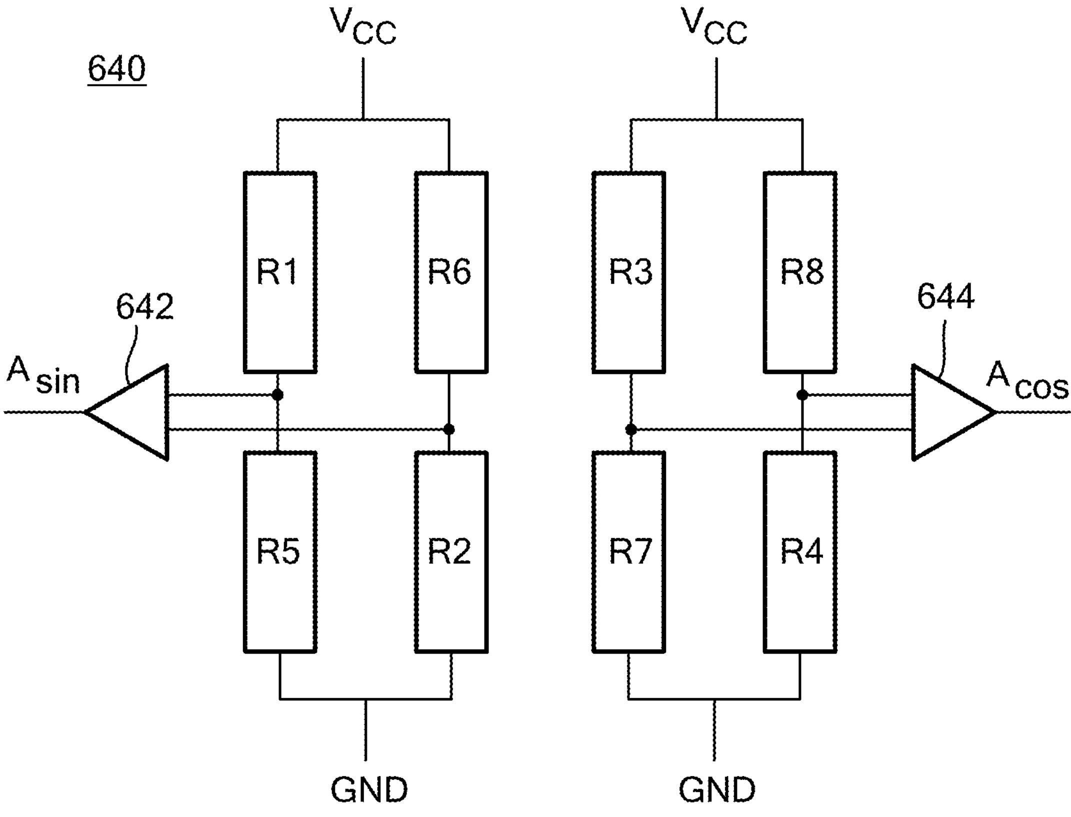
FIG. 6C is a circuit diagram illustrating how the magnetic field sensing elements of FIG. 6B may be connected to form two Wheatstone bridges.

FIGS. 6A-C show a configuration of magnetic field sensing elements that may be used within an absolute position sensor, according to some embodiments.

Referring to FIG. 6A, a sensor 600 can include an emitting coil 602, a first group of four ($A_{1-4}$) sensing elements 604 for detecting a target's master track, and a second group of four ($B_{1-4}$) sensing elements 606 for detecting the target's Nonius track. In some embodiments, the sensing elements 604, 606 may include MR elements.

The two groups of sensing elements 604, 606 may be located on opposite sides of the emitting coil 602, as shown. The sensing elements in first group 604 may be arranged in a line (along the x axis in the figure) spaced apart by a distance D14 and each set at a distance D15 from one side of emitting coil 602 (measured along the y axis in the figure). The sensing elements in second group 606 may be arranged in a line spaced apart by a distance D16 and each set at a distance D17 from the opposite side of emitting coil 602. In some cases, the element spacings D14 and D16 may be selected to be multiples of the target track pitches. For example, D14 and D16 may be a quarter of the master and Nonius track pitches, respectively $$\left(\text{i.e., } \frac{n+1}{4n}P \text{ and } \frac{P}{4}\right).$$

FIG. 6B shows a configuration of magnetic field sensing elements 620 that may be used with the sensor of FIG. 6A. That is, the group of master track elements 604 and/or the group of Nonius track elements 606 from FIG. 6A may utilize the configuration of FIG. 6B.

As shown, sensing elements 620 can include four (4) elements spaced apart by distance D18 along axis 622, which may correspond to the reference layer orientation in the case of MR elements. In some cases, D18 may be a quarter of the track pitch, i.e., $$\frac{n+1}{4n}P \text{ or } \frac{P}{4}.$$

In some cases, D18 may be equal to D14 or D16 from FIG. 6A.

As shown, each of the four elements may include, or be subdivided into, two resistors. All resistors may be the same and both resistors in a given element may be configured to sense the same field value (e.g., in-plane or out-of-plane). In the figure, resistors R1 and R2 form an element, R3 and R4 form an element, R5 and R6 form an element, and R7 and R8 form an element. This arrangement provides for eight (8) total resistances that can be connected to form two (2) Wheatstone bridges (a single Wheatstone bridge generally requires four (4) different resistances). For example, in the case of a MR element formed using an array of pillars, some rows of pillars may be connected to source (Vcc) and ground such that current flows in one direction through the MR element, while other rows of pillars may be connected such current flows in the opposite direction. Each pair of resistors sees a field which is nearly sinusoidal when a target is swept in front of the sensor, and adjacent pairs of resistors out-of-phase by $\pi/4$.

In other embodiments, more than four (4) magnetic field sensing elements may be used to provide eight (8) total resistances for the two Wheatstone bridges, with at least one of the elements not being subdivided.

FIG. 6C illustrates how the magnetic field sensing elements of FIG. 6B may be connected to form two Wheatstone bridges that provide orthogonal magnetic field signals (sine and cosine signals), according to some embodiments. Illustrative circuit 640 includes a first operational amplifier (op amp) 642 having a first input connected between resistors R1 and R5, a second input connected between resistors R2 and R6, and an output to provide a first magnetic field signal, $A_{sin}$. Circuit 640 further includes a second op amp 644 having a first input connected between resistors R3 and R7, a second input connected between resistors R4 and R8, and an output to provide a second magnetic field signal, $A_{cos}$.

It should be appreciated that two copies of circuit may be provided within sensor, one copy for the master track and one for the Nonius track. For the Nonius track, the resulting magnetic field signals are referred to herein as $B_{sin}$ and $B_{cos}$. Referring back to FIG. 1, the four analog magnetic field signals 146*a*, 146*b*, 146*c*, and 146*d* may correspond to $A_{sin}$, $A_{cos}$, $B_{sin}$, and $B_{cos}$, respectively.

Figure 7A:
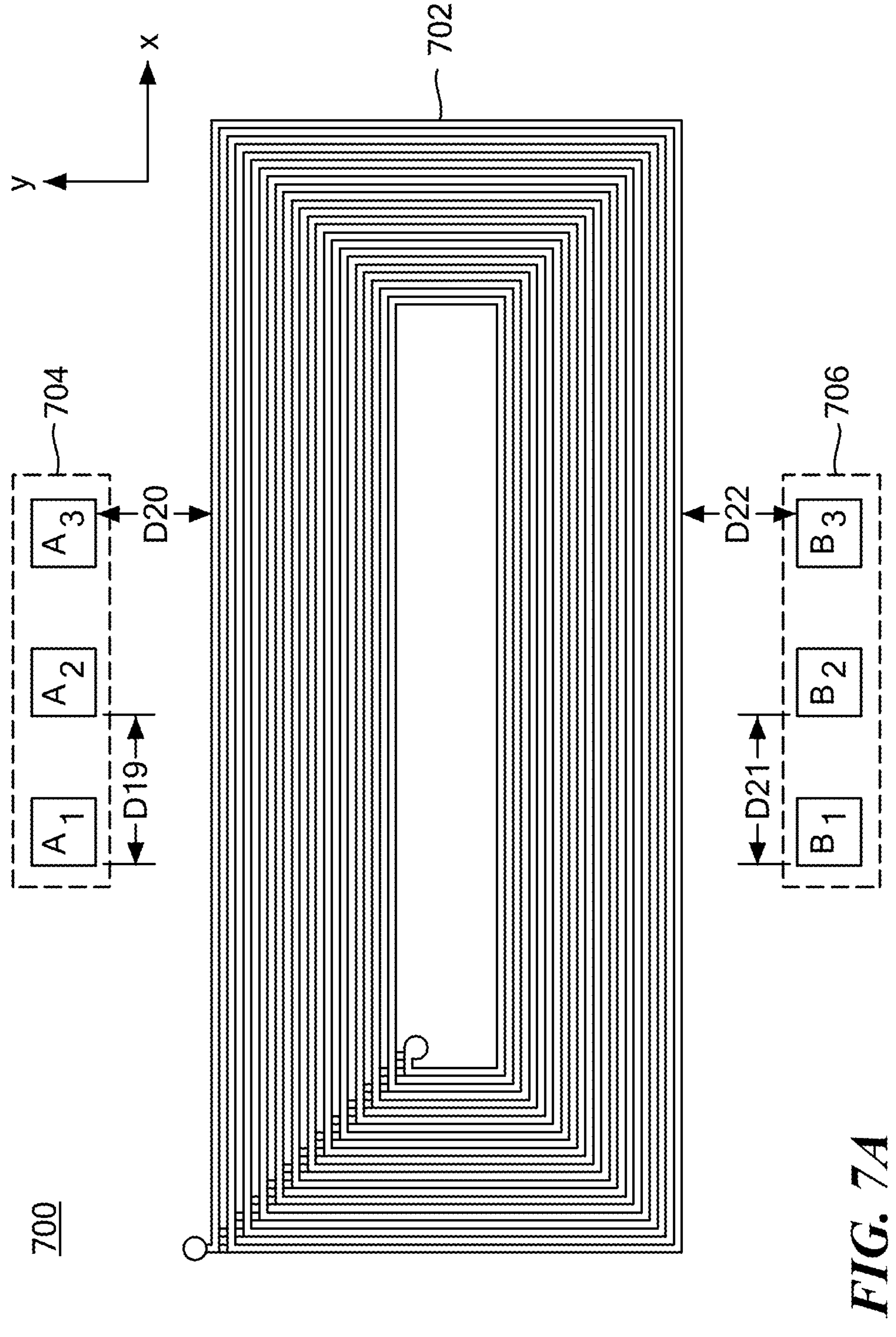
FIG. 7A is a top view of another absolute position sensor having two groups of magnetic field sensing elements arranged on opposite sides of an emitting coil, according to some embodiments.
Figure 7B:
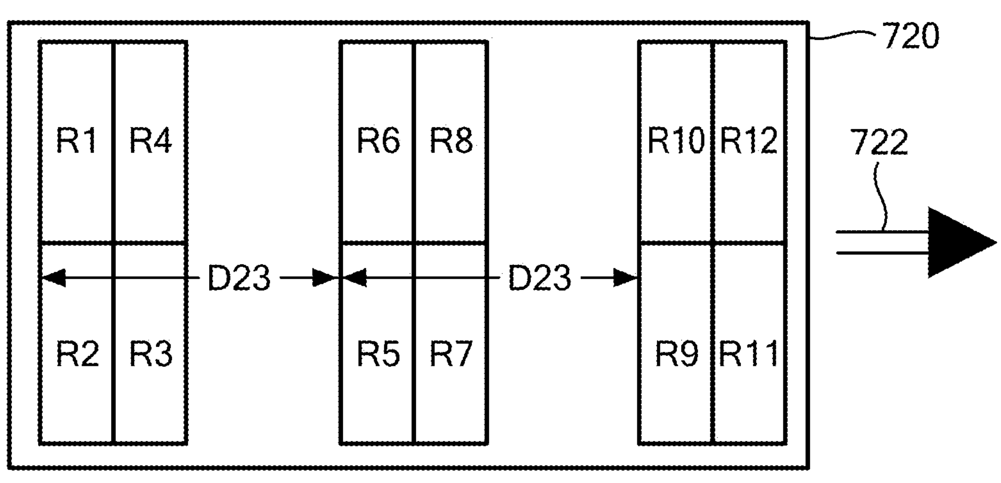
FIG. 7B is a schematic diagram showing a configuration of magnetic field sensing elements that may be used with the sensor of FIG. 7A.
Figure 7C:
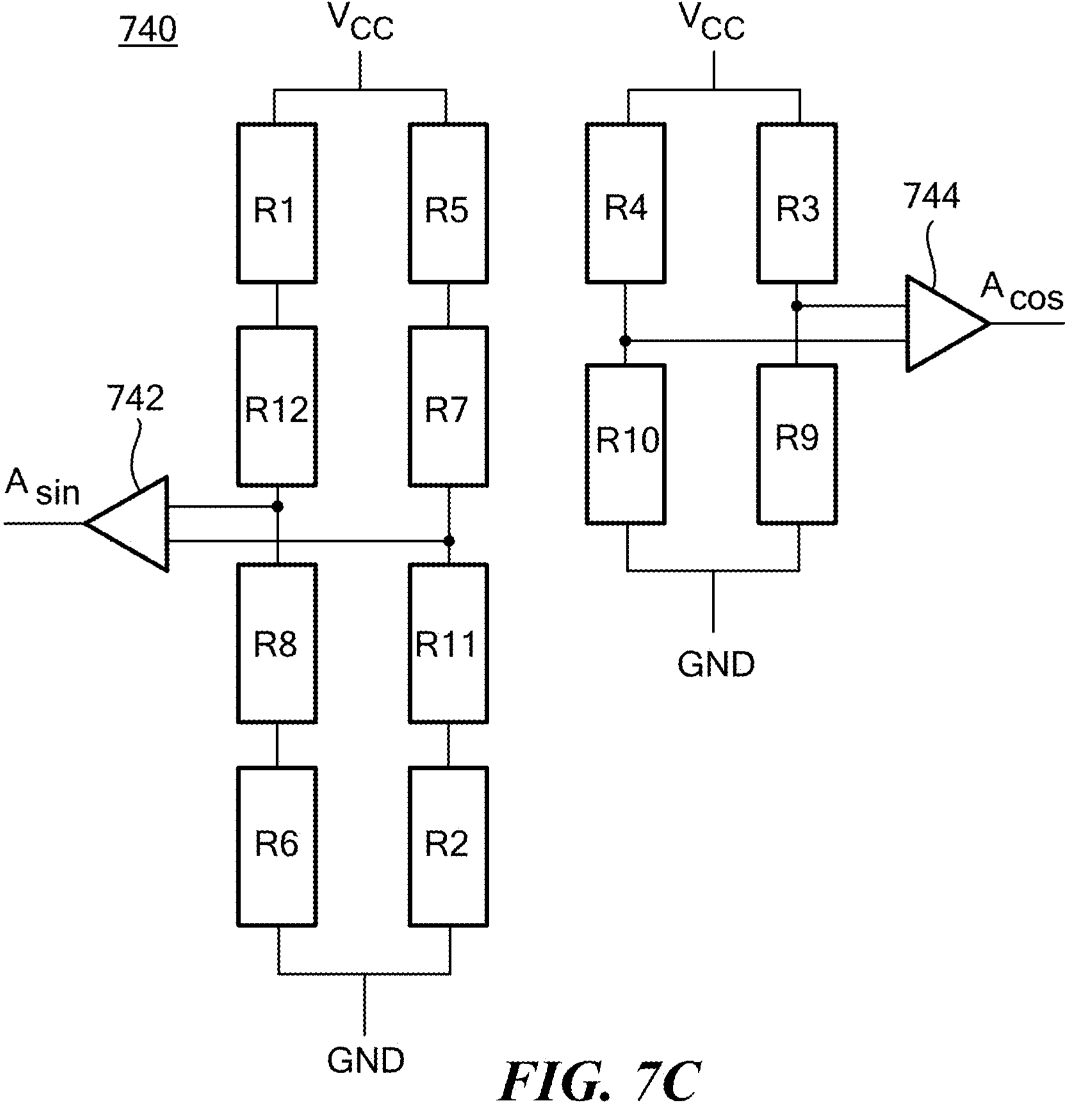
FIG. 7C is a circuit diagram illustrating how the magnetic field sensing elements of FIG. 7B may be connected to form two Wheatstone bridges.

FIGS. 7A-C are schematic diagrams showing another configuration of magnetic field sensing elements that may be used within an absolute position sensor, according to some embodiments.

Referring to FIG. 7A, a sensor 700 can include an emitting coil 702, a first group of three ($A_{1-3}$) sensing elements 704 for detecting a target's master track, and a second group of three ($B_{1-3}$) sensing elements 706 for detecting the target's Nonius track. In some embodiments, the sensing elements 704, 706 may include MR elements.

The two groups of sensing elements 704, 706 may be located on opposite sides of the emitting coil 702, as shown. The sensing elements in first group 704 may be arranged in a line (along the x axis in the figure) spaced apart by a distance D19 and each set at a distance D20 from one side of emitting coil 702 (measured along the y axis in the figure). The sensing elements in second group 706 may be arranged in a line spaced apart by a distance D21 and each set at a distance D22 from the opposite side of emitting coil 702. In some cases, the element spacings D19 and D21 may be selected to be multiples of the target track pitches. For example, D19 and D21 may be a quarter of the master and Nonius track pitches, respectively $$\left(\text{i.e., } \frac{n+1}{4n}P \text{ and } \frac{P}{4}\right).$$

FIG. 7B shows a configuration of magnetic field sensing elements 720 that may be used with the sensor of FIG. 7A. That is, the group of master track elements 704 and/or the group of Nonius track elements 706 from FIG. 7A may utilize the configuration of FIG. 7B.

As shown, sensing elements 720 can include three (4) elements spaced apart by distance D23 along axis 722, which may correspond to the reference layer orientation in the case of MR elements. In some cases, D23 may be a quarter of the track pitch, i.e., $$\frac{n+1}{4n}P \text{ or } \frac{P}{4}.$$

In some cases, D23 may be equal to D19 or D21 from FIG. 7A.

Each of the three (3) elements may include, or be subdivided into, four (4) resistors to provide twelve (12) total resistors that can be connected in different combinations to form two (2) Wheatstone bridges. All resistors may be the same and all resistors in a given element may be configured to sense the same field value (e.g., in-plane or out-of-plane). In the figure, resistors R1-R4 form an element, R5-R8 form an element, and R9-R12 form an element.

FIG. 7C illustrates how the resistors R1-R12 of FIG. 7B may be connected to form two Wheatstone bridges that provide orthogonal magnetic field signals (sine and cosine signals), according to some embodiments. Illustrative circuit 740 includes a first operational amplifier (op amp) 742 having a first input connected between resistances R1+R12 and R6+R8, a second input connected between resistances R2+R11 and R5+R7, and an output to provide a first magnetic field signal, $A_{sin}$. Circuit 740 further includes a second op amp 744 having a first input connected between resistors R4 and R10, a second input connected between resistors R3 and R9, and an output to provide a second magnetic field signal, $A_{cos}$.

It should be appreciated that two copies of circuit may be provided within sensor, one copy for the master track and one for the Nonius track. For the Nonius track, the resulting magnetic field signals are referred to herein as $B_{sin}$ and $B_{cos}$. Referring back to FIG. 1, the four analog magnetic field signals 146*a*, 146*b*, 146*c*, and 146*d* may correspond to $A_{sin}$, $A_{cos}$, $B_{sin}$, and $B_{cos}$, respectively.

Figure 8A:
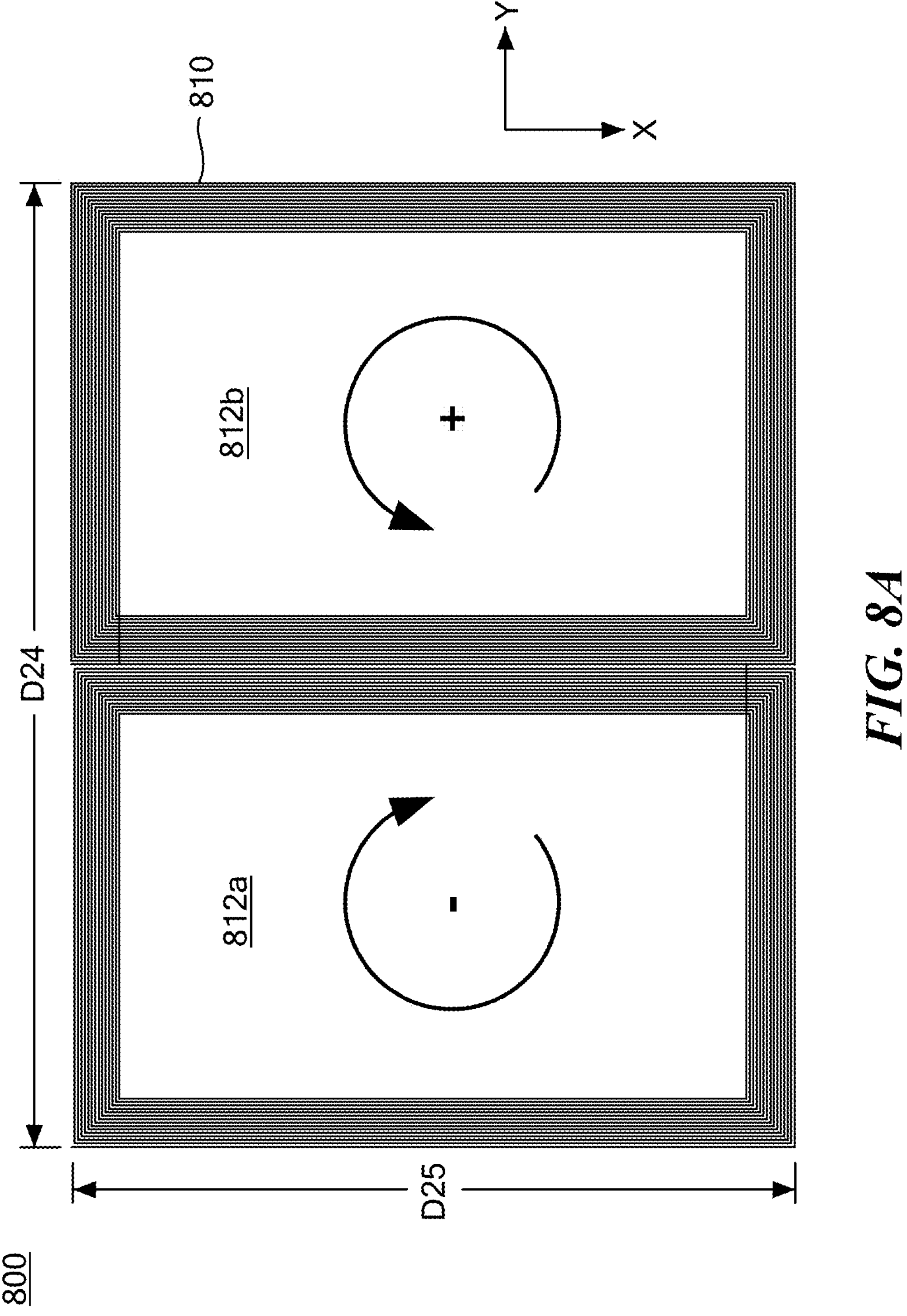
FIG. 8A is a top view showing a pair of coiled magnetic field sensing elements which may be used within an absolute position sensor, according to some embodiments.
Figure 8A:
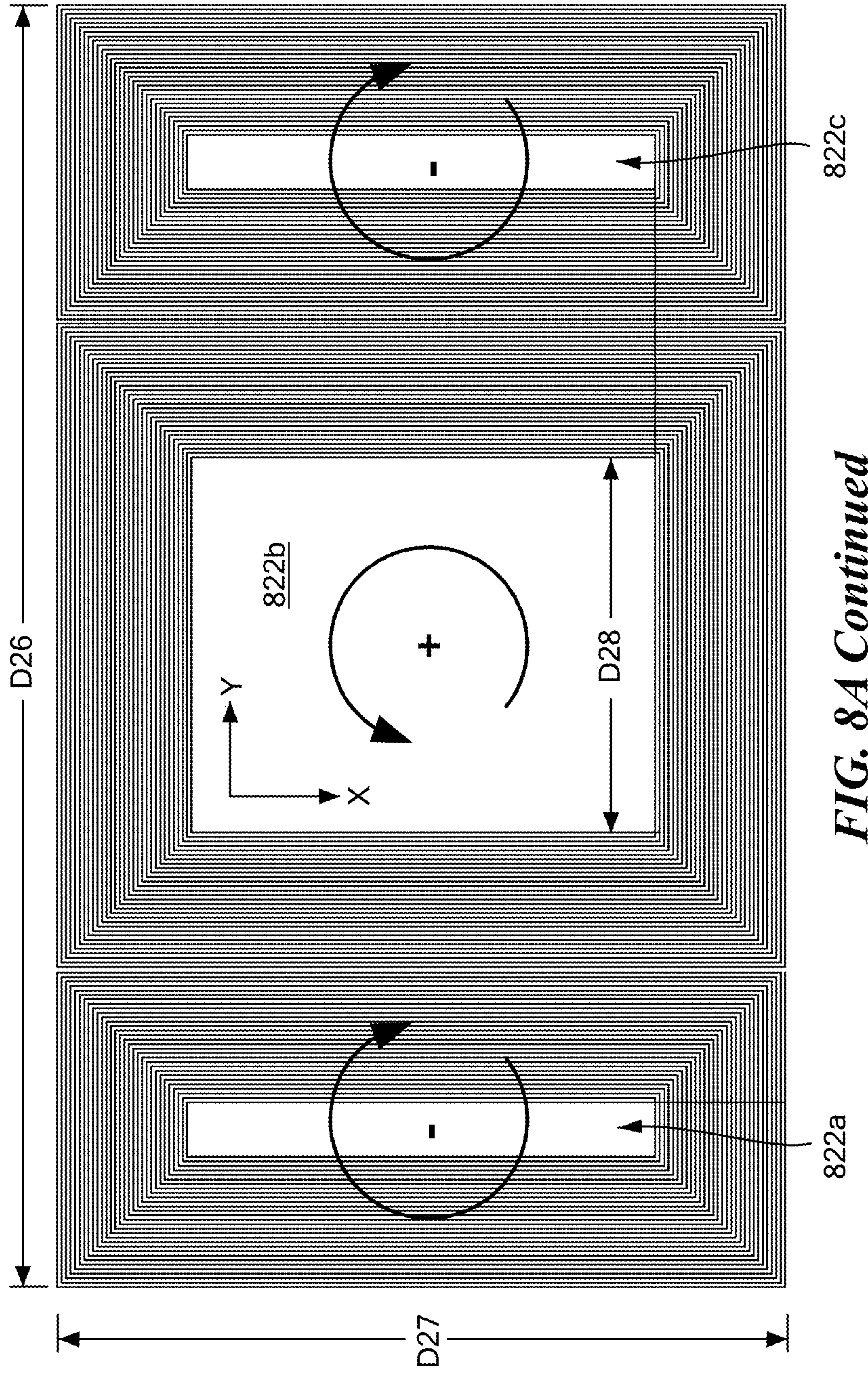
Figure 8B:
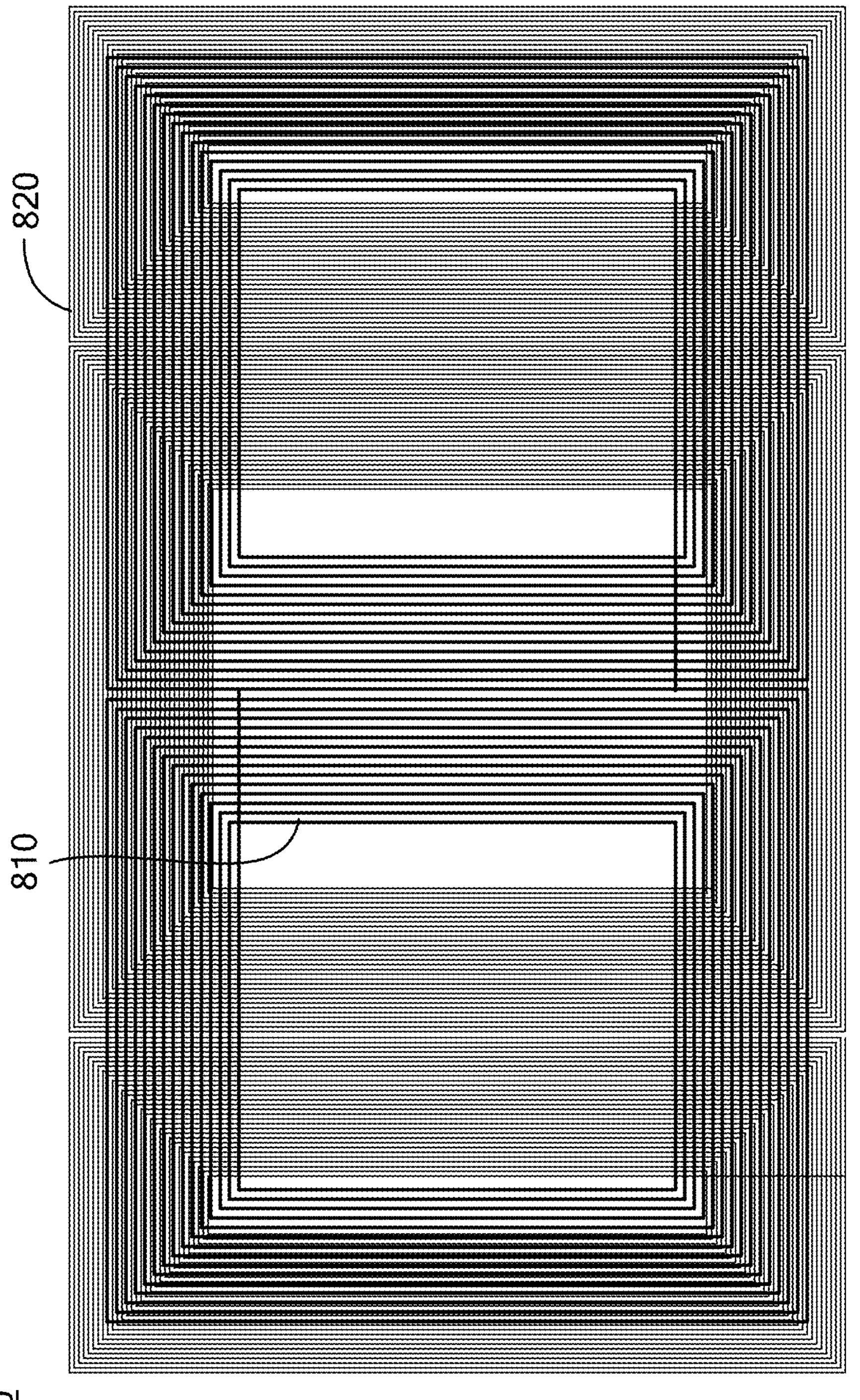
FIG. 8B is a top view showing the coiled magnetic field sensing elements of FIG. 8A with one coil superposed onto the other, according to some embodiments.

Turning to FIGS. 8A and 8B, according to some embodiments coiled magnetic field sensing elements may be used within an absolute position sensor. For example, master track sensing elements 204 and/or Nonius track sensing elements 206 of FIG. 2 may be provided as coiled ("induction-based") sensing elements.

An induction-based sensing element 800 can be composed of two coils: a first coil 810 to detect an in-phase field component (e.g., provide a cosine signal) and a second coil 820 to detect a quadrature field component (e.g., provide a sine signal).

First coil 810 can have a rectangular shape with side lengths D24 and a D25 and include two loops 812*a,b* with opposite winding directions and substantially equal area. First coil 810 can be said to provide gradient-based detection.

Second coil 820 can have a rectangular shape with side lengths D26 and a D27 and include three loops 822*a-c*, with the loops configured such that the sum of negative winding areas (loops 822*a,c*) and the positive winding area (loop 822*b*) is substantially equal to zero to prevent direct coupling from stray fields. Second coil 820 can be said to provide $2^{nd}$ derivative-based detection. Loop 822*b* may have a width D28, as shown.

In some cases, D24 and D26 may be selected to be substantially equal to the track pitch. In some cases, D25 and D27 may be selected to be substantially equal to D7 or D11 from FIG. 2. In some cases, D28 may be selected to cancel out the coupling with external uniform magnetic field.

As shown in FIGS. 8A and 8B, first coil 810 can be superimposed onto second coil 820 to form induction-based sensing element 800. Two such sensing elements 800 may be used within an absolute position sensor: one for the master track and one for the Nonius track.

Figure 9A:
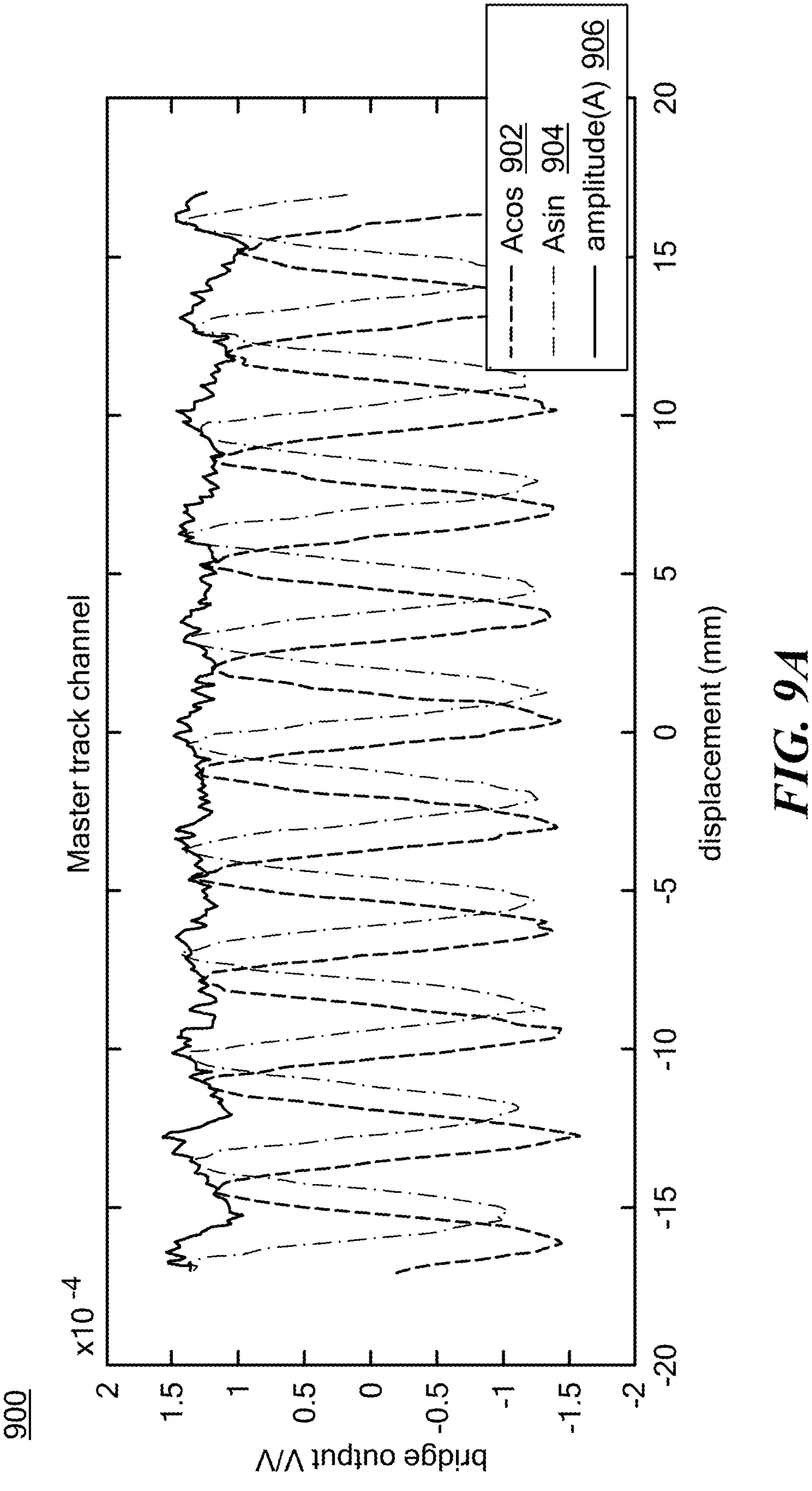
FIGS. 9A-C are a series of graphs illustrating the operation of an absolute position sensing system, according to some embodiments.
Figure 9A:
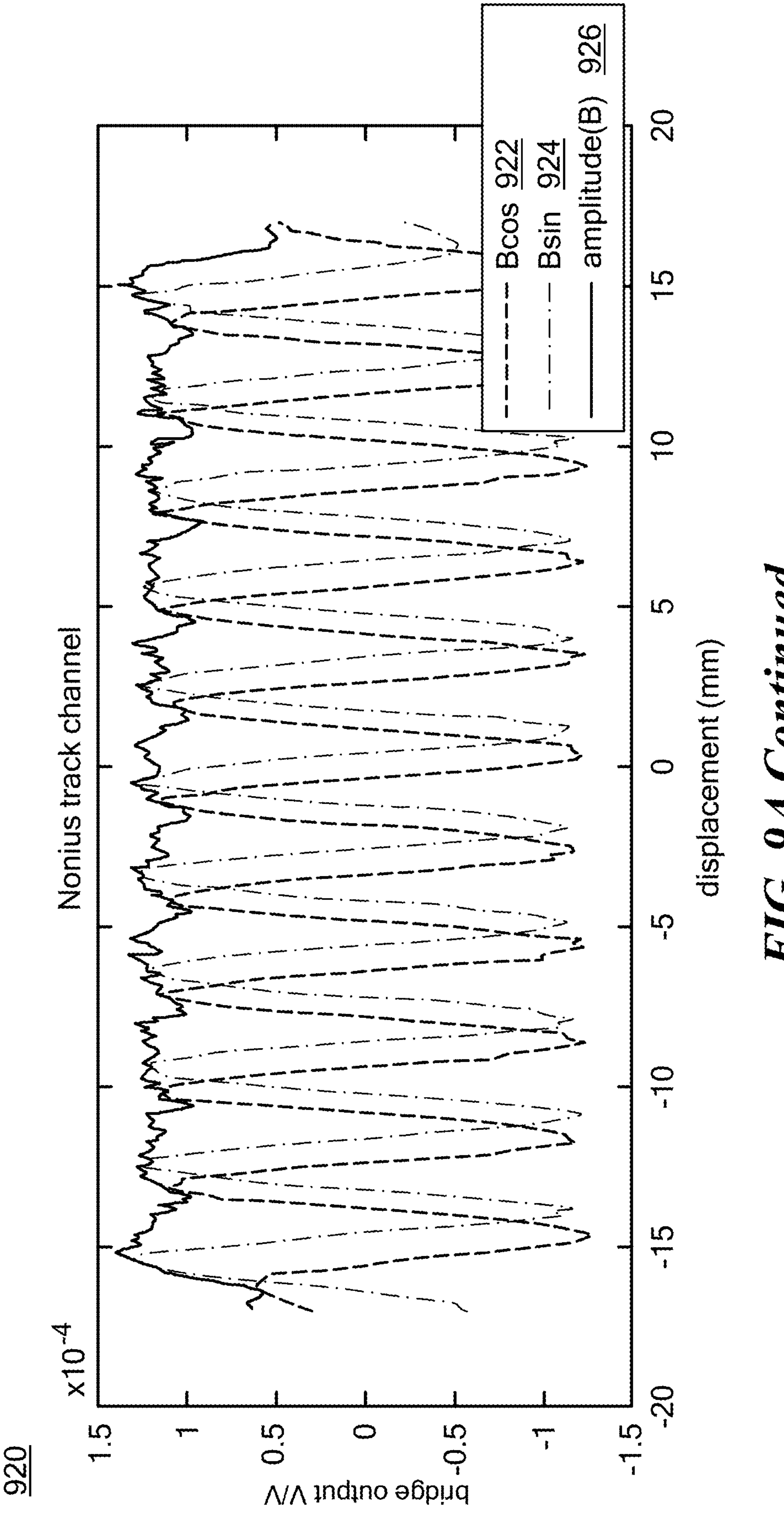
Figure 9B:
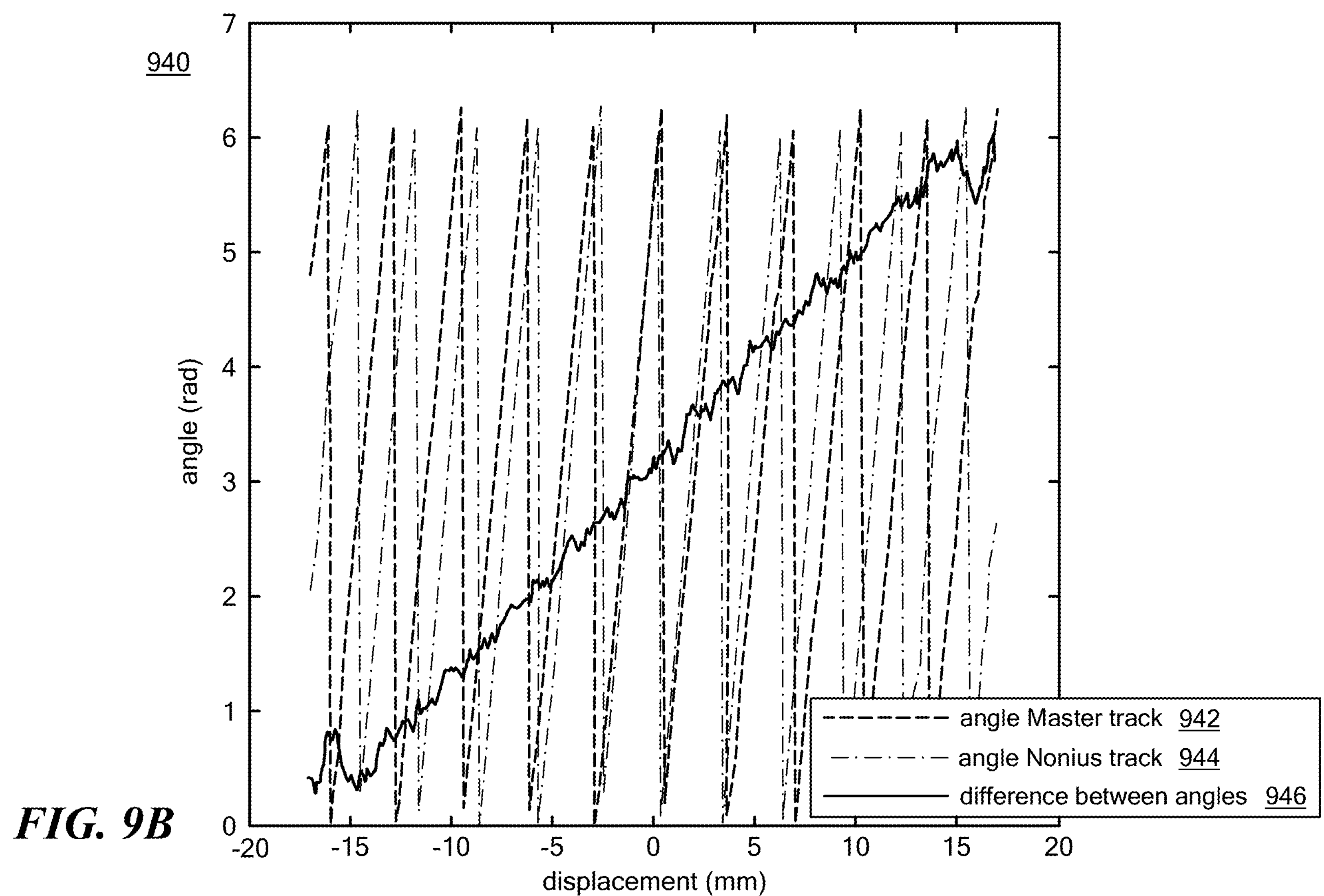
Figure 9C:
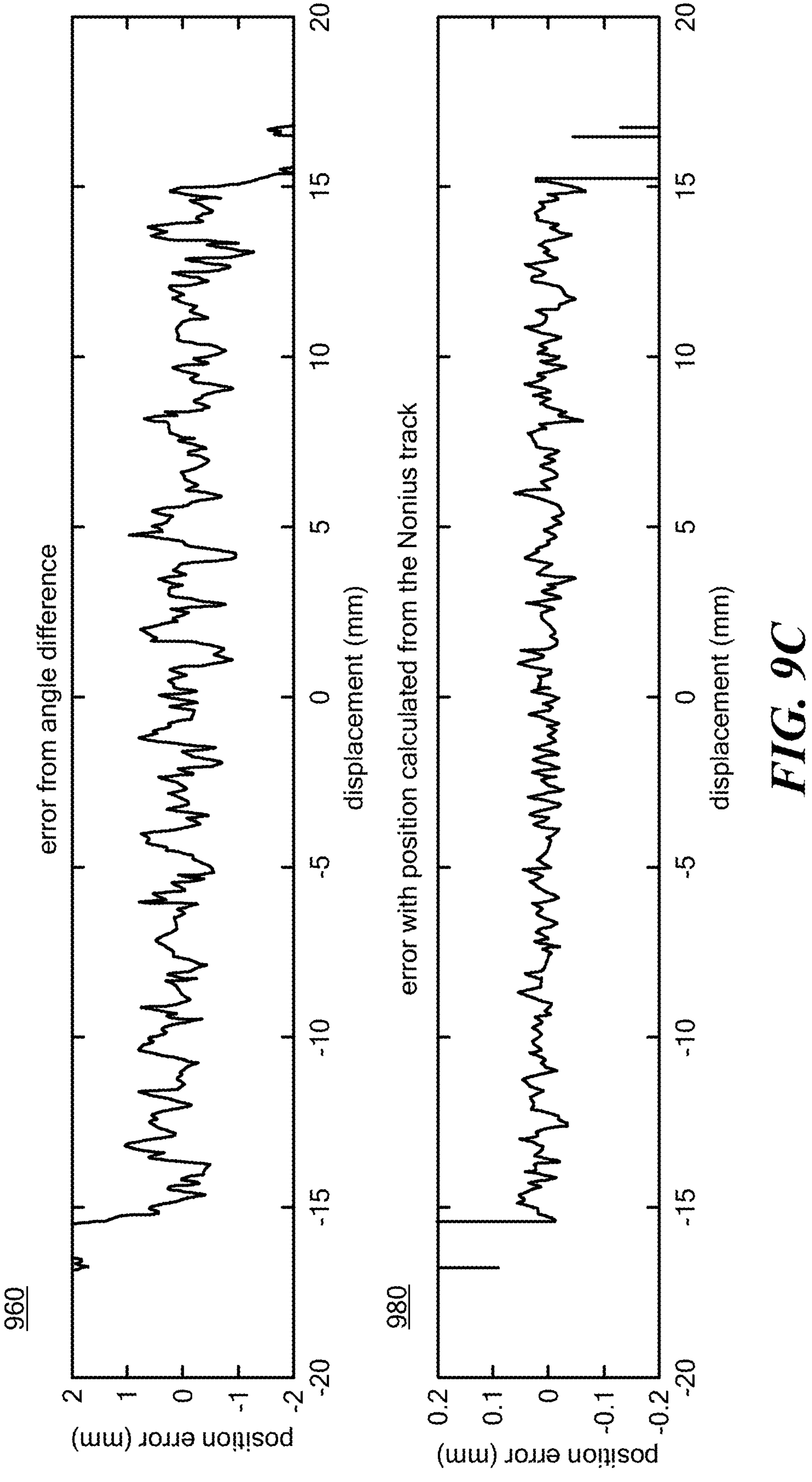

FIGS. 9A-C illustrate the operation of an absolute position sensing system, such as system 100 of FIG. 1 having the sensor configuration of FIGS. 6A-C.

In FIG. 9A, a pair of graphs 900, 920 illustrate magnetic field signals that can be obtained as a target is linearly displaced relative to the sensor, with horizontal axes corresponding to displacement in mm and vertical axes corresponding to signal voltage. A first graph 900 shows two master track signals $A_{cos}$, $A_{sin}$ (plots 902, 904) that may be obtained from two Wheatstone bridges, such as those shown in FIG. 6C. A second graph 920 shows two Nonius track signals $B_{cos}$, $B_{sin}$ (plots 922, 924) that may be obtained from two other Wheatstone bridges.

In more detail, the illustrated signals $A_{cos}$, $A_{sin}$, $B_{cos}$, and $B_{sin}$ may correspond to digitized versions of the analog magnetic field signals obtained from magnetic field sensing elements. The digital signals may be scaled and/or offset corrected using, for example, techniques described above in the context of FIG. 1.

Also plotted are amplitude signals 906, 926, which correspond to the length of the complex vector represented by the sine and cosine signals. In some cases, the amplitude signals 906, 926 may be used during the calibration. For example, the offset and the amplitude difference between the two channels can be adjusted to minimize the fluctuation of the amplitude when the target is swept. The amplitude signals may also provide information on the distance between the target and the sensor.

Turning to FIG. 9B, the signals $A_{cos}$, $A_{sin}$, $B_{cos}$, and $B_{sin}$ may be used to calculate master track incremental phase, $\phi_M$, using equation (1) and Nonius track incremental phase, $\phi_N$, using equation (2). $\phi_M$ and $\phi_M$ may be expressed in radians. A graph 940 illustrates the results of these calculations performed over a range target displacement (horizontal axis), with plot 942 corresponding to master track incremental phase, plot 944 corresponding to Nonius track incremental phase, and plot 946 corresponding to a difference, $\Delta\phi$, between those two incremental phases.

As illustrated in FIG. 9B, according to the vernier principle, there may be a generally linear relationship between target displacement and the difference, $\Delta\phi$, between the two incremental phases (modulus $2\pi$). Thus, following the vernier principle, the calculated difference, such as represented by plot 946, can be used to determine absolute position of the target. In some embodiments, an optimization technique may be used to determine the absolute position with improved accuracy. For example, expression (3) may be minimized as described above in the context of FIG. 1.

FIG. 9C includes a first graph 960 illustrating error from angle difference, i.e., $\Delta\phi \cdot P \cdot (n+1)$, and a second graph 9860 illustrating error with position calculated from the Nonius track, i.e., $\phi_N + k_N P$.

Figure 10:
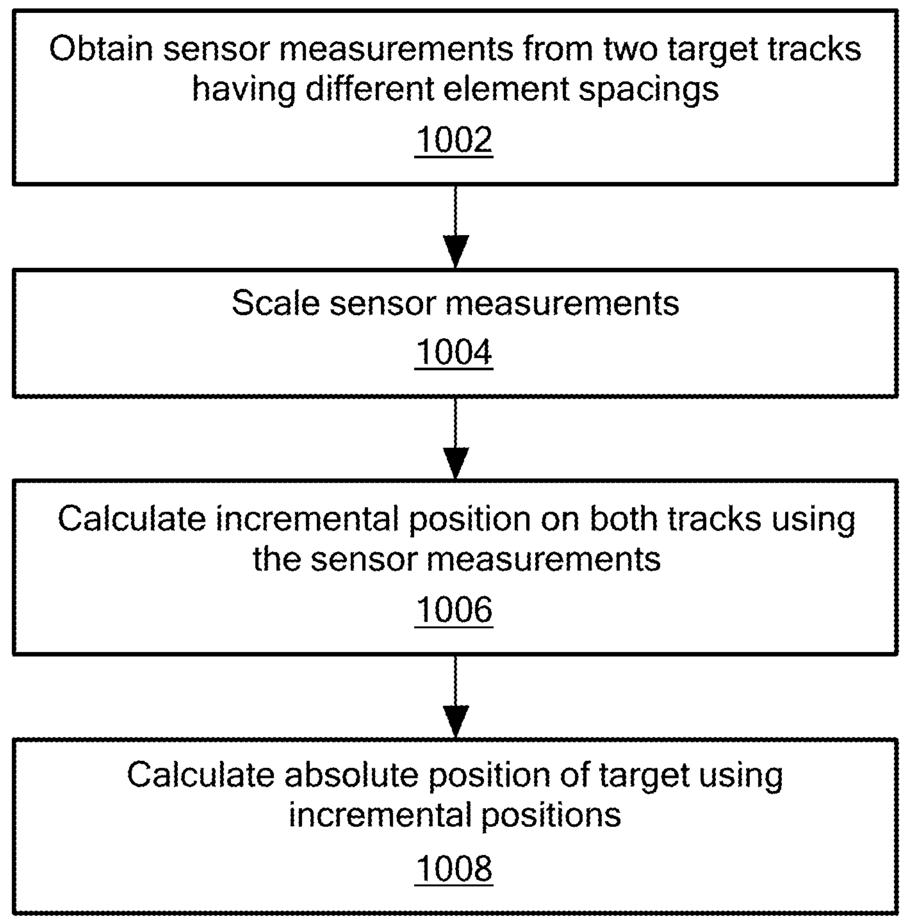
FIG. 10 is a flow diagram showing a process for an absolute position sensing, according to some embodiments.

FIG. 10 shows an illustrative process 1000 for an absolute position sensing, according to some embodiments. Process 1000 may be implemented within, executed by, or otherwise utilized by an absolute position sensing system, such as system 100 of FIG. 1. More particularly, process 1000 may correspond to digital signal processing performed by sensor 106 of FIG. 1.

At block 1002, sensor measurements can be obtained from two target tracks having different element spacings/pitch. In some cases, orthogonal measurements can be obtained for each track, for a total of four measurements (e.g., $A_{sin}$, $A_{cos}$, $B_{sin}$, $B_{cos}$). In some cases, these measurements may take the form of analog magnetic field signals, which signals may be demodulated and/or digitalized. The magnetic field signals may be responsive to a position of a target configured to move relative to the sensor.

At block 1004, the sensor measurements may be scaled and/or offset correction may be performed, such as described above in the context of FIG. 1.

At block 1006, an incremental target position may be calculated for both tracks using the sensor measurements. For example, signals $A_{cos}$, $A_{sin}$, $B_{cos}$, and $B_{sin}$ may be used to calculate master track incremental phase, $\phi_M$, using equation (1) and Nonius track incremental phase, $\phi_N$, using equation (2).

At block 1008, an absolute position of the target can be calculated from the incremental phases. In some embodiments, a difference, $\Delta\phi$, between the two incremental phases may be used to determine the absolution position according to the vernier principle. In some embodiments, an optimization technique may be used to determine the absolute position with improved accuracy. For example, expression (3) may be minimized as described above in the context of FIG. 1.

Figure 11A:
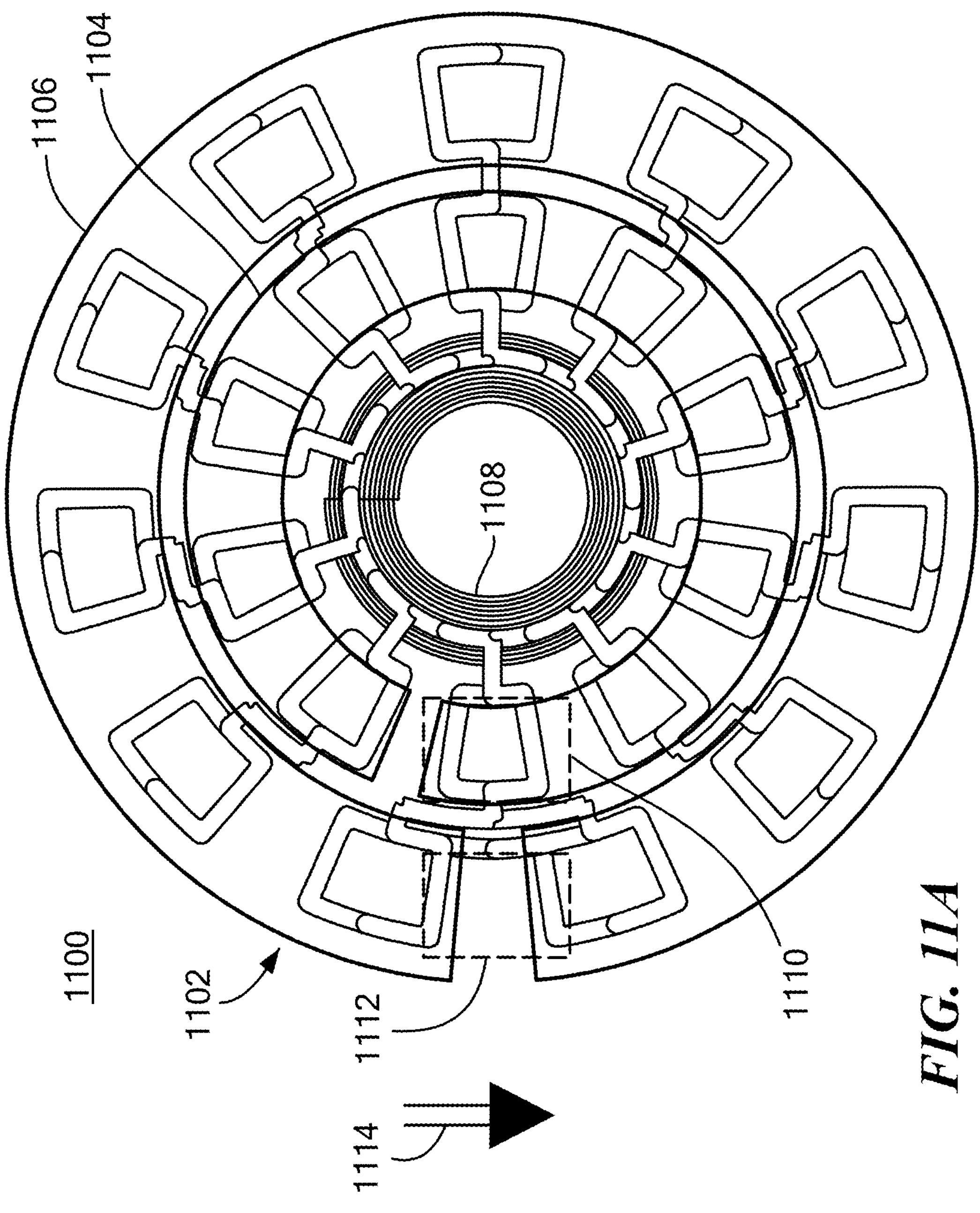
FIG. 11A is a top view of a rotatable target and sensor for detection absolute position thereof, according to some embodiments.
Figure 11B:
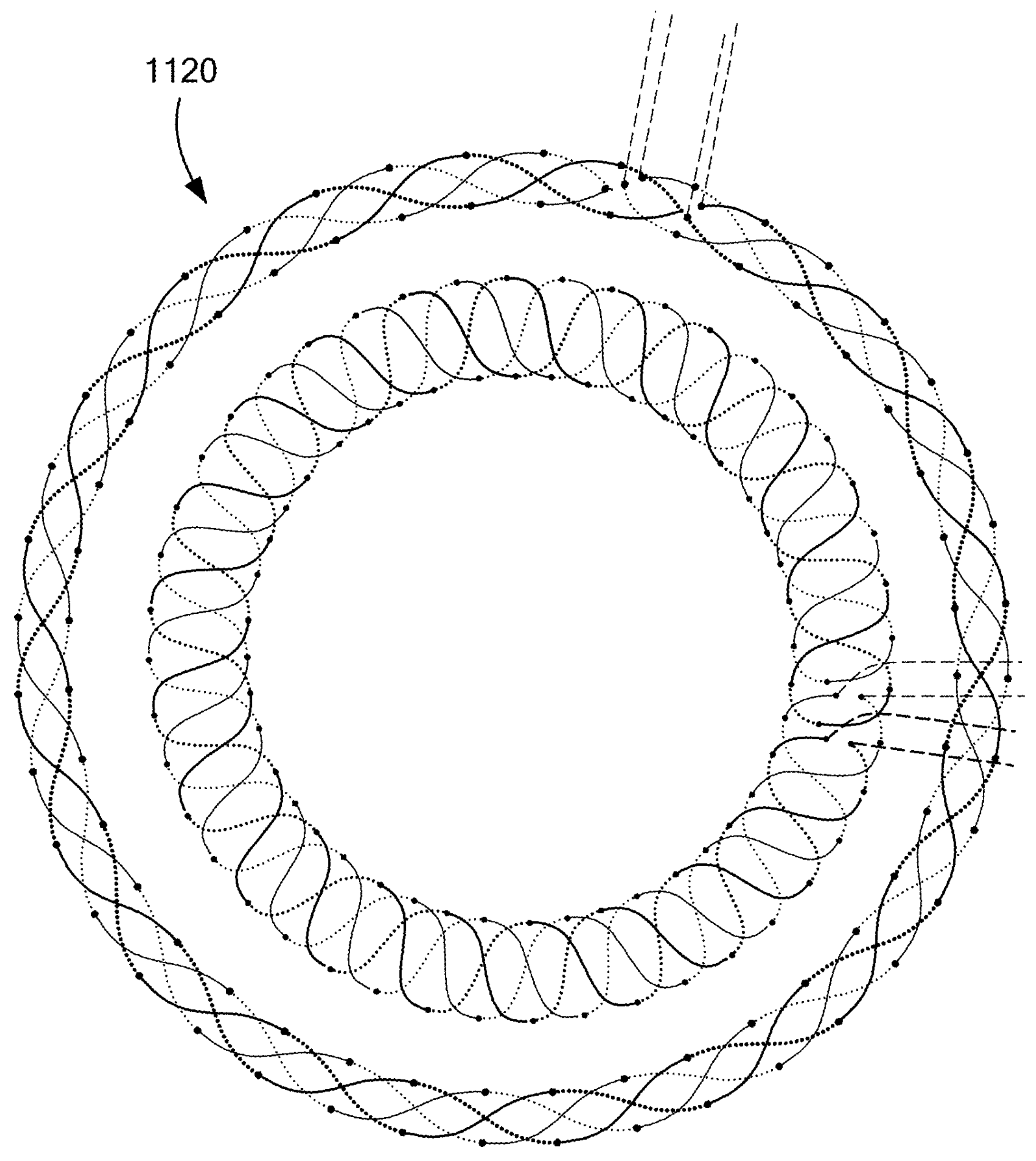
FIG. 11B is a top view of an arrangement of coiled magnetic field sensing elements that may be used to sense the target of FIG. 11A, according to some embodiments.
Figure 11C:
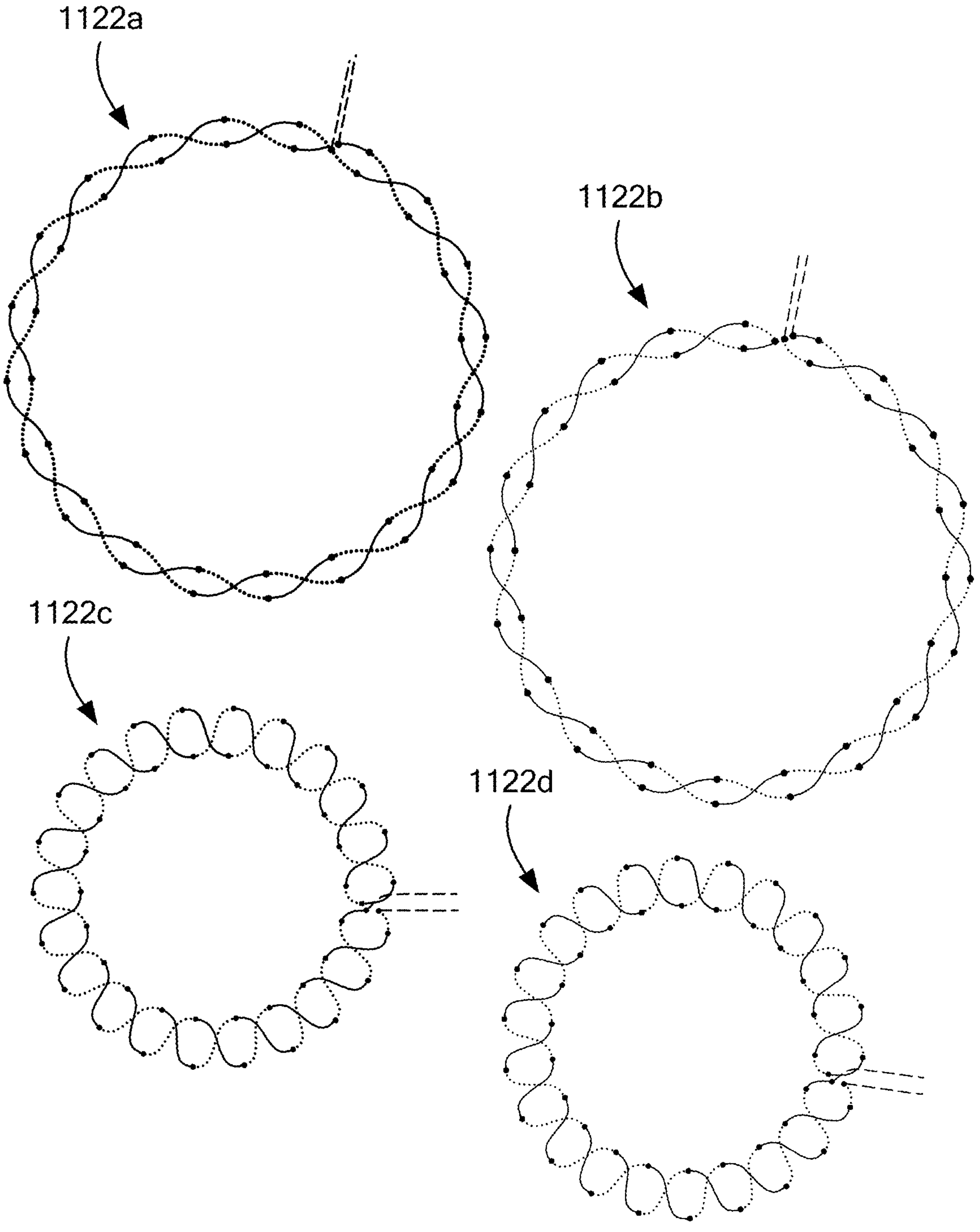
FIG. 11C is a deconstructed view of the arrangement of FIG. 11B, according to some embodiments.

Turning to FIGS. 11A-C, the general concepts, techniques, and structures disclosed herein may also be applied for detecting absolute position of a target configured to rotate with respect to a sensor.

As shown in FIG. 11A, a circular target 1102 can include a first plurality of conductive loops arranged to form a master track 1104 (inner track) and a second plurality of conductive loops arranged to form a Nonius track 1106 (outer track). In this example, master track 1104 includes ten (10) loops and Nonius track 1106 includes eleven (11) loops. Thus, whereas a linear target (such as in FIG. 2) may include an equal number of target elements in each of the two tracks but with different spacing, with a circular target (such as FIG. 11A) there may be different numbers of elements.

Target 1102 may be configured to rotate above a sensor having an emitting coil 1108 and one or more magnetic field sensing elements. The loops of both target tracks 1104, 1106 may be arranged to resonate in response to a magnetic field produced by emitting coil 1108. The sensor can include various types of sensing elements such as MR elements, inductive/coiled elements, or Hall elements.

In the case of MR elements, one or more first MR elements 1110 may be arranged below the master track 1104 to detect its position and one or more second MR elements 1112 may be arranged below the Nonius track 1106 to detect its position, as shown. Each set of MR elements 1110 and 1112 have a configuration similar to that of FIGS. 6B, 6C or of FIGS. 7B, 7C, but with the reference layer orientation 1114 shown in FIG. 11A. The two sets of MR elements 1110 can be used to obtain four magnetic field signals $A_{cos}$, $A_{sin}$, $B_{cos}$, and $B_{sin}$ for absolute position detection.

Turning to FIGS. 11B and 11C, in the case of inductive sensing, a coil structure 1120 may be positioned below the circular target 1102. The illustrative structure 1120 can include a first conductive path 1122*a* and a second conductive path 1122*b* both arranged to form a plurality of loops for inductively sensing the master track 1104. In some embodiments, the loops of 1122*a* and 1122*b* may be offset from each other by about 360/22°. Structure 1120 further includes a third conductive path 1122*c* and a fourth conductive path 1122*d* both arranged to form a plurality of loops for inductively sensing the Nonius track 1106. In some embodiments, the loops of 1122*c* and 1122*d* may be offset from each other by about 18°. The four conductive paths 1122*a-d* can be used to obtain four magnetic field signals $A_{cos}$, $A_{sin}$, $B_{cos}$, and $B_{sin}$ for absolute position detection. In FIGS. 11B and 11C, dotted lines indicate tracks which go on a layer below the solid lines. The two layers may be connected by vias, indicated with circles int he figures. In the example shown, master track conductive paths 1122*a*, 1122*b* may form ten (10) loops whereas Nonius track conductive paths 1122*c*. 1122*d* may form eleven (11) loops.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can include internal processors or modules that perform portions of the function, operation, or sequence of operations. Similarly, a module can include internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure A over element or structure B include situations in which one or more intermediate elements or structures (e.g., element C) is between elements A and B regardless of whether the characteristics and functionalities of elements A and/or B are substantially changed by the intermediate element(s).

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A system comprising:

a magnetic field sensor comprising:

an emitting coil configured to generate a magnetic field in response to a current through the emitting coil, a first arrangement of magnetic field sensing elements, and a second arrangement of magnetic field sensing elements; and a target configured to move relative to the magnetic field sensor and comprising:

a plurality of n+1 target coil elements each having a receiver coil, a first transmitter coil connected to the receiver coil, and -a second transmitter coil connected to the receiver coil, wherein adjacent pairs of the first transmitter coils are spaced apart by a first pitch $$\frac{n+1}{n}P$$

and adjacent pairs of the second transmitter coils are spaced apart by a second pitch P, wherein n is an integer greater than 0, wherein the magnetic field sensor is configured to:

calculate a first phase angle from one or more signals generated by the first arrangement of magnetic field sensing elements, calculate a second phase angle from one or more signals generated by the second arrangement of magnetic field sensing elements, and determine an absolute position of the target using the first phase angle and the second phase angle.

2. The system of claim 1 wherein the first transmitter coils are in a first linear arrangement and the second transmitter coils are in a second linear arrangement.

3. The system of claim 1 wherein the target coil elements are arranged such that, during the movement, different ones of the target coil elements pass over the magnetic field sensor, with the receiver coils passing over the emitting coil, the first transmitter coils passing over the first arrangement of magnetic field sensing elements, and the second transmitter coils passing over the second arrangement of magnetic field sensing elements.

4. The system of claim 1 wherein the target coil elements have a bilayer arrangement.

5. The system of claim 1 wherein the target coil elements have a single-layer arrangement.

6. The system of claim 1 wherein the first arrangement of magnetic field sensing elements comprises a first plurality of magnetoresistive (MR) elements and the second arrangement of magnetic field sensing elements comprises a second plurality of MR elements.

7. The system of claim 6 wherein the first plurality of MR elements and the second plurality of MR elements both comprise four MR elements, wherein the eight MR elements are connected to form four Wheatstone bridges.

8. The system of claim 6 wherein the first plurality of MR elements and the second plurality of MR elements both comprise three MR elements, wherein the six MR elements are connected to form four Wheatstone bridges.

9. The system of claim 1 wherein the first arrangement of magnetic field sensing elements comprises a first plurality of Hall elements and the second arrangement of magnetic field sensing elements comprises a second plurality of Hall elements.

10. The system of claim 1 wherein the first arrangement of magnetic field sensing elements comprises a first arrangement of superimposed coils and the second arrangement of magnetic field sensing elements comprises a second arrangement of superimposed coils.

11. The system of claim 1 wherein the target coil elements are arranged in a circular arrangement.

12. The system of claim 1 wherein the first arrangement of magnetic field sensing elements are configured to generate a first pair of orthogonal signals responsive to the movement and the second arrangement of magnetic field sensing elements are configured to generate a second pair of orthogonal signals responsive to the movement.

13. The system of claim 12 further comprising circuitry configured to:

receive the first pair of orthogonal signals from the first arrangement of magnetic field sensing elements;

receive the second pair of orthogonal signals from the second arrangement of magnetic field sensing elements; and determining an absolute position of the target relative to the magnetic field sensor using the first and second pairs of orthogonal signals.

14. The system of claim 1 wherein the magnetic field sensor is further configured to calculate a difference between the first phase angle and the second phase angle and map the difference to a target displacement value to determine the absolute position.

15. A target structure for use in a magnetic field sensing system, the target structure comprising:

a plurality of n+1 coil elements each having a receiver coil, a first transmitter coil connected to the receiver coil, and a second transmitter coil connected to the receiver coil, wherein the first transmitter coils are spaced apart by a first pitch $$\frac{n+1}{n}P$$

and the second transmitter coils are spaced apart by a second pitch P different from the first pitch, wherein n is an integer greater than 0.

16. The target structure of claim 15 wherein the first transmitter coils are in a first linear arrangement and the second transmitter coils are in a second linear arrangement.

17. The target structure of claim 15 wherein:

the magnetic field sensing system includes a magnetic field sensor having an emitting coil, a first arrangement of magnetic field sensing elements, and a second arrangement of magnetic field sensing elements, and the coil elements are arranged such that, during movement of the target structure relative to the magnetic field sensor, different ones of the coil elements pass over the magnetic field sensor, with the receiver coils passing over the emitting coil, the first transmitter coils passing over the first arrangement of magnetic field sensing elements, and the second transmitter coils passing over the second arrangement of magnetic field sensing elements.

18. A system comprising:

a magnetic field sensor comprising:

an emitting coil configured to generate a magnetic field in response to a current through the emitting coil, a first arrangement of magnetic field sensing elements comprising a first group of four sensing elements, and a second arrangement of magnetic field sensing elements comprising a second group of four sensing elements; and a target configured to move relative to the magnetic field sensor and comprising:

a plurality of n+1 target coil elements each having a receiver coil, a first transmitter coil connected to the receiver coil, and a second transmitter coil connected to the receiver coil, wherein adjacent pairs of the first transmitter coils are spaced apart by a first pitch n+1/n Pand adjacent pairs of the second transmitter coils are spaced apart by a second pitch P, wherein n is an integer greater than 0, wherein the magnetic field sensor is configured to:

calculate a first phase angle from one or more signals generated by the first arrangement of magnetic field sensing elements, calculate a second phase angle from one or more signals generated by the second arrangement of magnetic field sensing elements, and determine an absolute position of the target using the first phase angle and the second phase angle.

19. The system of claim 18 wherein the first group of four sensing elements is spaced apart by a first pitch $$\frac{n+1}{4n}P$$

and the second group of four sensing elements is spaced apart by a second pitch $$\frac{P}{4}.$$

20. The system of claim 18 wherein the magnetic field sensor is further configured to calculate a difference between the first phase angle and the second phase angle and map the difference to a target displacement value to determine the absolute position.

* * * * *